United States Patent
Ikeda et al.

(10) Patent No.: US 6,479,590 B1
(45) Date of Patent: Nov. 12, 2002

(54) ELECTRICAL INSULATING RESIN MATERIAL, ELECTRICAL INSULATING MATERIAL, AND ELECTRIC WIRE AND CABLE USING THE SAME

(75) Inventors: Masaaki Ikeda, Kawasaki (JP); Yoshimi Shimizu, Kawasaki (JP)

(73) Assignee: Japan Polyolefins Co., Ltd., Tokyo (JP)

( * ) Notice: Subject to any disclaimer, the term of this patent is extended or adjusted under 35 U.S.C. 154(b) by 0 days.

(21) Appl. No.: 09/787,376

(22) PCT Filed: Sep. 14, 1999

(86) PCT No.: PCT/JP99/05000

§ 371 (c)(1), (2), (4) Date: Mar. 16, 2001

(87) PCT Pub. No.: WO00/15713

PCT Pub. Date: Mar. 23, 2000

(30) Foreign Application Priority Data

Sep. 16, 1998 (JP) ............................................. 10-262105

(51) Int. Cl.[7] ......................... C08L 23/26; C08F 210/02; C08F 255/02; H01B 3/30
(52) U.S. Cl. ......................... 525/193; 525/217; 525/232; 525/238; 525/240; 525/241; 174/256; 174/119 C; 174/121 AR; 174/121 SR
(58) Field of Search ................................. 525/193, 217, 525/232, 238, 240, 241; 174/256, 119 C, 121 AR, 121 SR

(56) References Cited

U.S. PATENT DOCUMENTS

| | | | |
|---|---|---|---|
| 4,824,906 A | 4/1989 | Honsberg et al. | .............. 525/74 |
| 5,874,513 A | 2/1999 | Watanabe et al. | ........ 526/348.1 |

FOREIGN PATENT DOCUMENTS

| | | |
|---|---|---|
| CA | 2172889 | 9/1996 |
| CN | 1135490 | 11/1996 |
| EP | 0 735 059 | 10/1996 |
| JP | 60-23904 | 2/1985 |
| JP | 62-100909 | 5/1987 |
| JP | 63-150810 | 6/1988 |
| JP | 63-150811 | 6/1988 |
| JP | 63-301427 | 12/1988 |
| JP | 2-10610 | 1/1990 |
| JP | 2-119012 | 5/1990 |
| JP | 2-165506 | 6/1990 |
| JP | 4-11646 | 1/1992 |
| JP | 5-15007 | 2/1993 |
| JP | 5-266723 | 10/1993 |
| JP | 5-298928 | 11/1993 |
| JP | 6-509905 | 11/1994 |
| JP | 8-7653 | 1/1996 |
| JP | 8-111121 | 4/1996 |
| JP | 8-222026 | 8/1996 |
| JP | 9-17235 | 1/1997 |
| JP | 9-505090 | 5/1997 |
| JP | 9-302160 | 11/1997 |
| JP | 10-212377 | 8/1998 |

OTHER PUBLICATIONS

Patent Abstracts of Japan 8–111121.
Patent Abstracts of Japan 8–222026.
Patent Abstracts of Japan 9–302160.
Patent Abstracts of Japan 5–266723.
International Search Report.

*Primary Examiner*—Nathan M. Nutter
(74) *Attorney, Agent, or Firm*—Sughrue Mion, PLLC

(57) ABSTRACT

The present invention relates to a resin material for an electrical insulating material, an electrical insulating material and electric wire and cable using the same. A resin material for an electrical insulating material according to present invention is characterized in that the resin component thereof comprises an ethylene α-olefin copolymer (A) which satisfies specific conditions, such as a density of 0.92~0.96 g/cm$^3$, a melt flow rate (MFR) of 0.01~200 g/10 minutes, a molecular weight distribution (Mw/Mn) of 1.5~5.0, and possessing only one peak in terms of the number of peaks observed in an elution temperature-eluted amount curve as measured by the temperature raising elution fractionation (TREF) method, etc., wherein said resin component contains a unit derived from at least one type of monomer selected from among a carbonyl or carbonyl derivative group-containing monomer, a hydroxyl group-containing monomer, a nitro group-containing monomer, a nitrile group-containing monomer, an aromatic ring-containing monomer, and a compound or monomer containing two or more ethylenic linkages. This resin material for an electrical insulating material is suitable for use in an electrical insulating material for an electric wire and cable, as it exhibits excellent processability and electrical insulating properties without degradation of the mechanical strength, and even after cross-linking, exhibits superior electrical insulating properties.

24 Claims, 4 Drawing Sheets

TREF CURVE OF THE ETHYLENE COPOLYMER ACCORDING TO THE PRESENT INVENTION

ELECTRICAL INSULATING RESIN MATERIAL, ELECTRICAL INSULATING MATERIAL, AND ELECTRIC WIRE AND CABLE USING THE SAME

TECHNICAL FIELD

The present invention relates to a resin material for an electrical insulating material characterized in comprising an ethylene α-olefin copolymer possessing a superior processability and thermal resistance, in addition to an excellent mechanical strength and electrical insulating properties; an electrical insulating material and electric wire and cable using the same. Specifically, the present invention relates to a resin material for an electrical insulating material possessing superior electrical insulating properties, such as volume resistivity, space charge characteristics, dielectric breakdown strength, and the like; a resin material for an electrical insulating material in which even after cross-linking, degradation of electrical insulating properties, e.g., volume resistivity, space charge characteristics, dielectric breakdown strength, and the like does not occur; and an electrical insulating material formed from the aforementioned resin material and cross-linked product, and electric wire and cable possessing an insulating layer using the same. This application is based on a patent application filed in Japan (Japanese Patent Application No. Hei 10-262105), the contents of which are incorporated herein by reference.

BACKGROUND ART

Conventionally, electrical insulating materials for electric wire and cables fundamentally require a high volume resistivity, and a high dielectric breakdown voltage, in addition to a low dielectric constant and dielectric dissipation factor, for which a polyethylene or the like is generally used. In addition, as an electric power cable for use in mass transmission, such as a high-tension power cable and the like, a cable which uses an insulating material to which oil has been filled (hereinafter referred to as "OF cable") is routinely employed. However, this OF cable, despite possessing excellent electrical insulating properties, is disadvantageous in that oil often leaks out, which in turn necessitates a means for continuously supplying oil. In recent years, a cross-linked polyethylene has been used which possesses an increased thermal resistance and mechanical strength, and is obtained by means of cross-linking the polyolefin of a polyethylene or the like.

One of the problems associated with this high-tension power cable, which uses a cross-linked polyethylene in its electrical insulating material, relates to the power loss that occurs during high-tension transmission. Hence, the reduction of this aforementioned power loss is highly desirable. It is possible to reduce this power loss by means of increasing the electrical insulating performance of the electrical insulating material, in particular by increasing the volume resistivity.

However, even by simply increasing the volume resistivity at either room temperature or constant temperature, this leads to other problems as described below. For example, in a power cable, the electrical insulating material around the inner conductor will reach 90° C. from the Joule heat of the electric current, however the electrical insulating material around the outer conductor remains at atmospheric temperature. In the case of an electrical insulating material employing a conventional polyethylene in which extreme reductions in the volume resistivity accompany temperature increase, an electrical field is concentrated around the interface of the outer conductor and insulating member, which reduces the dielectric breakdown strength. This phenomenon, in particular, creates large problems with regard to dc electric power cables. Accordingly, it is highly desirable to decrease the temperature dependence of the volume resistivity of the electrical insulating material.

With regard to a method for improving the temperature dependence of the volume resistivity of the electrical insulating material, a method is proposed in which maleic anhydride is grafted to a low pressure process polyethylene (e.g., Japanese Patent Application, First Publication No. Hei 2-10610 and the like). However, as an electrical insulating material, the electric power cables using this low pressure process polyethylene shows an inferior flexibility when compared with convention electric power cables.

In this manner, as an electrical insulating material, electric power cables using a low density polyethylene to which maleic anhydride has been grafted are proposed in Japanese Patent Application, First Publication No. Sho 63-150810, Japanese Patent Application, First Publication No. Sho 63-150811 and Japanese Patent Application, First Publication No. Hei 2-119012. However, the electrical insulating materials used in these electric power cables are disadvantageous in that the volume resistivity is reduced at high temperature.

In addition, in Japanese Patent Application, First Publication No. Hei 5-266723, an electrical insulating material is obtained by means of blending 100 parts by weight of a low density polyethylene, possessing a density of 0.92 g/cm$^3$, and 0.5 to 20 parts by weight of a linear low density polyethylene, possessing a density of 0.91 to 0.94 g/cm$^3$. However, the improvement of the temperature dependence of the volume resistivity provided by means of this electrical insulating material is inadequate, since this electrical insulating material does not sufficiently improve the volume resistivity around the inner conductor.

In addition, a polyolefin such as polyethylene or the like, which is used as an electrical insulating material for electric wires and cables, may be employed after undergoing cross-linking in order to increase properties such as the thermal resistance and mechanical strength.

As methods for cross-linking a polyolefin such as polyethylene, an electron beam cross-linking method and a chemical cross-linking method, which uses peroxides, are known. However, the electron beam cross-linking method requires large scale equipment, and possesses the disadvantage of high cost. In addition, the chemical cross-linking method, although economical, results in problems due to the existence of an unreacted cross-linking agent, as this residue causes reduction of the volume resistivity, degradation of the space-charge characteristics, and generation of water-treeing.

As a method for improving the electrical insulating properties, e.g., volume resistivity, space charge characteristics, water-treeing resistance, etc., a method in which a maleic anhydride-modified polyolefin is added to polyethylene in order to introduce hydrophilic group is proposed in Japanese Patent Application, Second Publication No. Hei 5-15007. Furthermore, a trial is being conducted in an attempt to improve the electrical insulating properties by means of introducing a double bond into the polyolefin prior to cross-linking, and reducing the addition amount of the cross-linking agent (Japanese Patent Application, First Publication No. Hei 4-11646). However, all of the aforementioned fail to produce both adequate electrical insulating properties, e.g., volume resistivity and the like, and thermal resistance.

On the other hand, technology for improving the electrical insulating properties of electrical insulating material such as the volume resistivity, dielectric breakdown strength and the like is being proposed in which a carbonic acid compound and/or aromatic compound is mixed into a polyolefin. For example, various technologies are being proposed for improving the impulse breakdown strength by means of grafting a styrene to a polyolefin (Japanese Patent Application, First Publication No. Hei. 2-165506); improving the impulse breakdown strength by means of blending a polystyrene into polyethylene (Japanese Patent Application, First Publication No. Sho. 63-301427); improving the electrical insulating properties such as volume resistivity and the like means of blending a maleic acid-modified polyolefin into a polyethylene (Japanese Patent Application, First Publication No. Sho. 62-1000909); improving the dielectric breakdown characteristics by means of blending an aromatic carboxylic acid into a polyolefin (Japanese Patent Application, First Publication No. Sho. 60-23904); and the like.

However, all of the aforementioned technologies are not able to achieve sufficient improvement of both the volume resistivity and dielectric breakdown strength. In addition, the electrical insulating properties even after cross-linking are inadequate.

On the other hand, Japanese Patent Application, First Publication No. Hei 9-17235 discloses electrical insulating material comprising a high mechanical strength and low electrical activation energy by means of employing a specific ethylene copolymer of a narrow composition distribution.

However, the composition distribution of the aforementioned ethylene copolymer is extremely narrow, while the change in viscosity and strength with respect to temperature is extreme, which in turn leads to narrowing of the appropriate range of conditions such as the temperature at the time of polymer processing, extrusion conditions, and the like, and results in poor processability.

In addition, an electrical insulating material employing an ethylene polymer manufactured by means of using a metallocene catalyst, and electric wire and cable using the same are disclosed in Japanese Patent Application, First Publication No. Hei 6-509905, Japanese Patent Application, First Publication No. Hei 8-111121, and Japanese Patent Application, First Publication No. Hei 8-222026. However, although these disclosures achieve an improvement in the treeing resistance, the appropriate range of conditions such as the temperature at the time of polymer processing, extrusion conditions, and the like are narrow, which in turn results in poor processability.

As a means for improving the processability of the ethylene polymer manufactured by means of using a metallocene catalyst, methods are known in which components of differing molecular weights are blended together, or the ethylene polymer is polymerized in multiple stages. However, even when using these types of means for improving the processability, it is still difficult to always achieve a sufficient improvement in the processability of the ethylene polymer manufactured by means of using a metallocene catalyst.

Furthermore, a method for blending an ethylene polymer manufactured by means of using a metallocene catalyst, and ethylene polymer of different molecular weight manufactured by means of using a Ziegler catalyst or a Phillips catalyst, are disclosed in, for example, Japanese Patent Application, First Publication No. Hei 9-505090. However, the dispersability of the aforementioned is insufficient, resulting in disadvantages such as melt fractures, and reduction of the mechanical strength.

In order to solve the aforementioned problems, Japanese Patent Application, First Publication No. Hei 9-302160 discloses a resin composition for an electrical insulating material comprising a resin component of an ethylene homopolymer or an ethylene copolymer satisfying specific parameters, such as a density of 0.86 to 0.96 g/cm$^3$, MFR of 0.01 to 200 g/10 minutes, molecular weight distribution (Mw/Mn) of 1.5 to 5.0, a composition distribution parameter of no greater than 2.00, and an electrical activation energy of no greater than 0.4 eV, which contains a monomer unit selected from among a carbonyl or carbonyl derivative group-containing monomer, hydroxyl group-containing monomer, nitro group-containing monomer, nitrile group-containing monomer, aromatic ring-containing monomer and a compound or monomer containing two or more ethylenic linkages. However, a resin composition for an electrical insulating material, which further improves properties such as thermal resistance and the like, is required.

The present invention provides a resin material for an electrical insulating material possessing a superior processability and thermal resistance, in addition to superior electrical insulating properties, such as volume resistivity, space charge characteristics, dielectric breakdown strength, water-treeing resistance, and the like, in which a reduction in the mechanical strength does not occur; or a resin material for an electrical insulating material which is rich in cross-linkability, and even after cross-linking, exhibits superior volume resistivity, space-charge characteristics, dielectric breakdown strength, water-treeing resistance and the like; and an electrical insulating material formed from the aforementioned resin material and/or cross-linked product, and electric wire and cable possessing an insulating layer using the same.

DISCLOSURE OF INVENTION

The resin material for an electrical insulating material according to the present invention is characterized in that the resin component thereof comprises an ethylene α-olefin copolymer (A), obtained by means of copolymerizing ethylene and $C_{4-12}$ α-olefin, said ethylene α-olefin copolymer (A) satisfying specific parameters (i) to (v):

(i) a density of 0.92 to 0.96 g/cm$^3$, (ii) a melt flow rate (MFR) of 0.01 to 200 g/10 minutes, (iii) a molecular weight distribution (Mw/Mn) of 1.5 to 5.0, (iv) possessing only one peak in terms of the number of peaks observed in an elution temperature-eluted amount curve as measured by the continuous temperature raising elution fractionation (TREF) method, and from the integrated elution curve obtained by said elution temperature-eluted amount curve, the difference $T_{75}-T_{25}$ in the temperature and said density d respectively follow the relationships shown by formula a and formula b, wherein $T_{25}$ is the temperature where 25% of the total elution is obtained, and $T_{75}$ is the temperature where 75% of the total elution is obtained; and (v) possessing one or two melting point peaks, and among these the highest melting point $T_{m1}$ and said density d follow the relationship described by formula c;

wherein said resin component contains a unit (B) derived from at least one type of monomer selected from among a carbonyl or carbonyl derivative group-containing monomer (M1), a hydroxyl group-containing monomer (M2), a nitro group-containing monomer (M3), a nitrile group-containing monomer (M4), an aromatic ring-containing monomer (M5) and a compound or monomer containing two or more ethylenic linkages (M6); and when said unit (B) is derived from at least one type of monomer selected from M1 to M5, the concentration of said unit (B) ranges from $5 \times 10^{-7}$ to $5 \times 10^{-3}$ mol per one gram of said resin component, and when said unit (B) is derived from M6, the number of ethylenic linkages per 1000 carbon atoms of said resin component is at least 0.8.

if $d < 0.950$ g/cm$^3$, then (Formula a)

$T_{75} - T_{25} \geq -300 \times d + 285$ if $d \geq 0.950$ g/cm$^3$, then $T_{75} - T_{25} \geq 0$ $T_{75} - T_{25} < -670 \times d + 644$ (Formula b)

$T_{m1} \geq 150 d - 17$ (Formula c)

This resin material for an electrical insulating materials displays superior processability and thermal resistance, in addition to superior electrical insulating properties, such as volume resistivity, space charge characteristics, dielectric breakdown strength, water-treeing resistance, and the like, in which a reduction in the mechanical strength does not occur. In addition, the resin material for an electrical insulating is rich in cross-linkability, and even after cross-linking, exhibits superior volume resistivity, space charge characteristics, dielectric breakdown strength, water-treeing resistance and the like.

In addition, the aforementioned ethylene α-olefin copolymer (A) also satisfies specific conditions (i) to (vii):

(i) a density of 0.92 to 0.96 g/cm$^3$, (ii) a melt flow rate (MFR) of 0.01 to 200 g/10 minutes, (iii) a molecular weight distribution (Mw/Mn) of 1.5 to 3.5, (iv) possessing only one peak in terms of the number of peaks observed in an elution temperature-eluted amount curve as measured by the continuous temperature raising elution fractionation (TREF) method, and from the integrated elution curve obtained by said elution temperature-eluted amount curve, the difference $T_{75} - T_{25}$ in the temperature and said density d respectively follow the relationships shown by formula a and formula b, wherein $T_{25}$ is the temperature where 25% of the total elution is obtained, and $T_{75}$, is the temperature where 75% of the total elution is obtained;

(v) possessing one or two melting point peaks, and among these the highest melting point $T_{m1}$ and said density d follow the relationship described by formula c;

(vi) an electrical activation energy of no greater than 0.4 eV; and (vii) the melt tension (MT) and melt flow rate (MFR) follow the relationship shown by formula d.

if $d < 0.950$ g/cm$^3$, then (Formula a)

$T_{75} - T_{25} \geq -300 \times d + 285$ if $d \geq 0.950$ g/cm$^3$, then $T_{75} - T_{25} \geq 0$ $T_{75} - T_{25} \geq -670 \times d + 644$ (Formula b)

$T_{m1} \geq 150 \times d - 17$ (Formula c)

$\log MT \leq -0.572 \times \log MFR + 0.3$ (Formula d)

The resin material for an electrical insulating material comprising this ethylene α-olefin copolymer (A) displays a superior processability and thermal resistance, in addition to superior electrical insulating properties, such as volume resistivity, space charge characteristics, dielectric breakdown strength, water-treeing resistance, and the like, in which a reduction in the mechanical strength does not occur. In addition, the resin material for an electrical insulating material is rich in cross-linkability, and even after cross-linking, exhibits superior volume resistivity, space charge characteristics, dielectric breakdown voltage, water-treeing resistance and the like.

In addition, said ethylene α-olefin copolymer (A) is preferably obtained by means of copolymerizing ethylene and $C_{4-12}$ α-olefin under the presence of a catalyst comprising a cyclic organic compound containing at least a conjugated double bond, and a compound containing transition metal from group IV of the Periodic Table. The resin material for an electrical insulating material comprising this ethylene α-olefin copolymer (A) displays a more superior processability, thermal resistance, mechanical strength, and electrical insulating properties.

In addition, the halogen concentration within said ethylene α-olefin copolymer (A) is preferably no greater than 10 ppm. The resin material for an electrical insulating material comprising this ethylene α-olefin copolymer (A) does not require the addition of additives such as halogen acceptor or the like, and thus maintains superior electrical insulating properties.

In addition, said resin component may also comprise said ethylene α-olefin copolymer (A), and another polyolefin (A').

In addition, said other polyolefin (A') is preferably at least one compound selected from among a polyethylene obtained by means of a high pressure radical polymerization, a high density polyethylene, a medium density polyethylene, and a linear low density polyethylene. The resin material for an electrical insulating comprising this other polyolefin (A') exhibits superior extrusion molding characteristics.

In addition, said carbonyl or carbonyl derivative group-containing monomer (M1) to be introduced into said resin component is preferably at least one compound selected from among maleic anhydride and (meth)acrylic acid. The resin material for an electrical insulating material introducing this monomer unit results in a large improvement in the volume resistivity.

In addition, a maleic anhydride-modified ethylene α-olefin copolymer (A) is preferably used at the time said carbonyl or carbonyl derivative group-containing monomer (M1) is introduced into said resin component. The resin material for an electrical insulating material comprising this copolymer results in a particularly large improvement in the volume resistivity.

In addition, a polystyrene, an ethylene-styrene random copolymer, or an ethylene copolymer (A), which has been modified by means of grafting an aromatic ring-containing monomer, is preferably used at the time said aromatic ring-containing monomer (M5) is introduced into said resin component. The resin material for an electrical insulating material comprising this copolymer results in a large improvement in the dielectric breakdown strength.

In addition, at least one compound selected from among an liquid polybutadiene, a maleic anhydride-modified liquid polybutadiene, an ethylene-aryl(meth)acrylate copolymer, and an ethylene-vinyl(meth)acrylate copolymer is preferably used at the time said compound or monomer containing two or more ethylenic linkages (M6) is introduced into said resin component. The resin material for an electrical insulating material comprising these polymer or copolymer displays superior electrical insulating properties after cross-linking and an excellent cross-linking efficiency.

In addition, said resin component preferably contains said compound or monomer containing two or more ethylenic linkages (M6) and said carbonyl or carbonyl derivative group-containing monomer (M1). The resin material for an electrical insulating material introducing these monomers shows a superior cross-linking efficiency and volume resistivity.

In addition, a maleic anhydride-modified liquid polybutadiene and a maleic anhydride-modified ethylene cc-olefin copolymer (A) are preferably used at the time said carbonyl or carbonyl derivative group-containing monomer (M1) and said compound or monomer containing two or more ethylenic linkages (M6) are introduced into said resin component. The resin material for an electrical insulating material comprising these copolymers results in large improvements of the electrical insulating properties after cross-linking, cross-linking efficiency, and volume resistivity.

In addition, said resin component preferably contains said compound or monomer containing two or more ethylenic linkages (M6) and said aromatic ring-containing monomer (M5). The resin material for an electrical insulating material introducing these monomers displays a superior cross-linking efficiency, volume resistivity, and dielectric breakdown strength.

In addition, a maleic anhydride-modified liquid polybutadiene and an ethylene-styrene random copolymer are preferably used at the time said compound or monomer containing two or more ethylenic linkages (M6) and said aromatic ring-containing monomer (M5) are introduced into said resin component. The resin material for an electrical insulating comprising these copolymers results in large improvements of the electrical insulating properties after cross-linking, cross-linking efficiency, volume resistivity, and dielectric breakdown strength.

In addition, said resin component preferably contains said carbonyl or carbonyl derivative group-containing monomer (M1) and said aromatic ring-containing monomer (M5). The resin material for an electrical insulating material introducing these monomers displays a superior volume resistivity and dielectric breakdown strength.

In addition, a maleic anhydride-modified ethylene α-olefin copolymer (A) and an ethylene-styrene random copolymer are preferably used at the time said carbonyl or carbonyl derivative group-containing monomer (M1) and said aromatic ring-containing monomer (M5) are introduced into said resin component. The resin material for an electrical insulating material comprising these copolymers results in large improvements of the volume resistivity, and dielectric breakdown strength.

In addition, said resin component preferably contains said carbonyl or carbonyl derivative group-containing monomer (M1), said compound or monomer containing two or more ethylenic linkages (M6), and said aromatic ring-containing monomer (M5). The resin material for an electrical insulating material introducing these monomers displays a superior cross-linking efficiency, volume resistivity, and dielectric breakdown strength.

In addition, a maleic anhydride-modified liquid polybutadiene, a maleic anhydride-modified ethylene α-olefin copolymer (A) and an ethylene-styrene random copolymer are preferably used at the time said carbonyl or carbonyl derivative group-containing monomer (M1), said compound or monomer containing two or more ethylenic linkages (M6), and said aromatic ring-containing monomer (M5) are introduced into said resin component. The resin material for an electrical insulating material comprising these copolymers results in large improvements of the electrical insulating properties after cross-linking, cross-linking efficiency, volume resistivity, and dielectric breakdown strength.

In addition, the electrical insulating material according to the present invention is characterized in using the aforementioned resin material for an electrical insulating material. This electrical insulating material displays a superior processability, mechanical strength, and electrical insulating properties.

In addition, the electrical insulating material according to the present invention preferably comprises a maleic anhydride-modified ethylene α-olefin copolymer (A).

In addition, the electrical insulating material according to the present invention preferably comprises a maleic anhydride-modified ethylene α-olefin copolymer (A) and an ethylene-styrene random copolymer.

In addition, the electrical insulating material according to the present invention is characterized in that a resin material for an electrical insulating described in the aforementioned is cross-linked. This electrical insulating material displays an even more superior mechanical strength.

In addition, the electrical insulating material according to the present invention preferably comprises a cross-linked resin material for an electrical insulating material comprising a maleic anhydride-modified liquid polybutadiene, and a maleic anhydride-modified ethylene α-olefin copolymer (A).

In addition, the electrical insulating material according to the present invention preferably comprises a cross-linked resin material for an electrical insulating material comprising a maleic anhydride-modified liquid polybutadiene, and an ethylene-styrene random copolymer.

In addition, the electrical insulating material according to the present invention preferably comprises a cross-linked resin material for an electrical insulating material comprising a maleic anhydride-modified liquid polybutadiene, maleic anhydride-modified ethylene α-olefin copolymer (A) and an ethylene-styrene random copolymer.

In addition, the electric wire and cable according to the present invention is characterized in using cross-linked or non-cross-linked electrical insulating material described above as an insulating layer. This electric wire and cable display a superior mechanical strength and electrical insulating properties.

BRIEF DESCRIPTION OF DRAWINGS

FIG. 2 is a diagram showing an electrode system for measuring the volume resistivity.

BEST MODE FOR CARRYING OUT THE INVENTION

Figure 1:
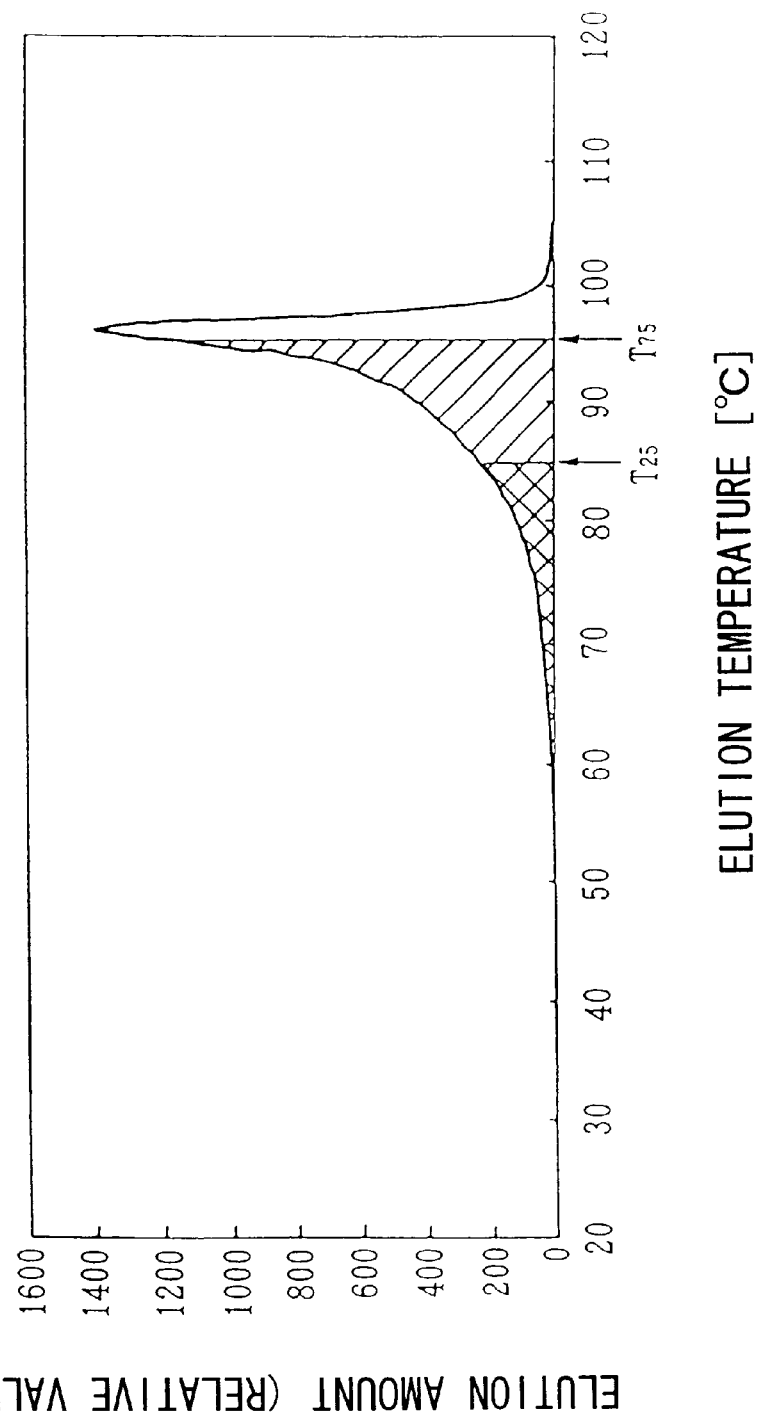
FIG. 1 is a graph showing an example of a TREF curve of an ethylene α-olefin copolymer (A) in the present invention.

In the following, the present invention is described in detail.

The ethylene α-olefin copolymer (A) of the present invention (hereinafter referred to as "ethylene copolymer (A)") is obtained by means of copolymerizing ethylene and $C_{4-12}$ α-olefin, and satisfies specific condition (i) to (v):

(i) a density of 0.92 to 0.96 g/cm$^3$, (ii) a melt flow rate (MFR) of 0.01 to 200 g/10 minutes, (iii) a molecular weight distribution (Mw/Mn) of 1.5 to 5.0, (iv) possessing only one peak in terms of the number of peaks observed in an elution temperature-eluted amount curve as measured by the continuous temperature raising elution fractionation (TREF) method, and from the integrated elution curve obtained by said elution temperature-eluted amount curve, the difference $T_{75}-T_{25}$ in the temperature and said density d respectively follow the relationships shown by formula a and formula b, wherein $T_{25}$ is the temperature where 25% of the total elution is obtained, and $T_{75}$ is the temperature where 75% of the total elution is obtained; and (v) possessing one or two melting point peaks, and among these the highest melting point $T_{m1}$ and said density d follow the relationship described by formula c;

if $d<0.950$ g/cm$^3$, then (Formula a)

$T_{75}-T_{25} \geq -300 \times d + 285$ if $d \geq 0.950$ g/cm$^3$, then $T_{75}-T_{25} \leq 0$ $T_{75}-T_{25} \geq -670 \times d + 644$ (Formula b)

$T_{m1} \geq 150 \times d - 17$ (Formula c)

The α-olefin of the ethylene copolymer (A) according to the present invention comprises from 4 to 12 carbon atoms, and preferably from 5 to 10 carbon atoms, including 1-pentene, 4-methyl-1-pentene, 1-hexene, 1-octene, 1-decene, 1-dodecene, and the like. In addition, the total concentration of the α-olefin is preferably no greater than 30 mol %, and more preferably 3 to 20 mol %.

The density of the ethylene copolymer (A) according to the present invention is within the range of 0.92 to 0.96 g/cm$^3$ (i), preferably 0.925 to 0.94 g/cm$^3$, and more preferably 0.925 to 0.935 g/cm$^3$. A density of less than 0.92 g/cm$^3$ leads to a product of inferior rigidity and thermal resistance, while a density exceeding 0.96 g/cm$^3$ produces a product that is excessively hard, leading to a reduction in mechanical strength, e.g., impact strength.

The melt flow rate (hereinafter referred to as "MFR") of the ethylene copolymer (A) according to the present invention is 0.01 to 200 g/10 minutes (ii), preferably 0.05 to 50 g/10 minutes, and more preferably 0.1 to 40 g/10 minutes. An MFR less than 0.01 g/10 minutes leads to a poor processability, while an MFR exceeding 200 g/10 minutes leads to a low mechanical strength.

The molecular weight distribution (Mw/Mn) of the ethylene copolymer (A) according to the present invention is within the range of 1.5 to 5.0 (iii), and preferably within the range of 1.5 to 3.5. A Mw/Mn of less than 1.5 leads to a poor processability, while a Mw/Mn exceeding 5.0 leads to a low mechanical strength, e.g., impact strength.

In general, the molecular weight distribution (Mw/Mn) of the ethylene copolymer (A) can be obtained by means of obtaining the weight average molecular weight (Mw) and number average molecular weight (Mn) by means of gel permeation chromatography (GPC), and then calculating the ratio (Mw/Mn) therefrom.

The ethylene copolymer (A) according to the present invention, as shown in FIG. 1, possesses only one peak in terms of the number of peaks observed in an elution temperature-eluted amount curve as measured by the continuous temperature raising elution fractionation (TREF) method, and from the integrated elution curve observed by said elution temperature-eluted amount curve, the difference $T_{75}-T_{25}$ in the temperature and said density d respectively follow the relationships shown by formula a and formula b (iv), wherein $T_{25}$ is the temperature where 25% of the total elution is obtained, and $T_{75}$ is the temperature where 75% of the total elution is obtained.

if $d<0.950$ g/cm$^3$, then (Formula a)

$T_{75}-T_{25} \geq -300 \times d + 285$ if $d \geq 0.950$ g/cm$^3$, then $T_{75}-Th_{25} 24\ 0$ $T_{75}-T_{25} \leq -670 \times d + 644$ (Formula b)

In the case when $T_{75}-T_{25}$ and density d do not satisfy the aforementioned relationship shown by formula a, an inferior thermal resistance results; and when $T_{75}-T_{25}$ and density d do not satisfy the aforementioned relationship shown by formula b, an inferior processability results at low temperatures.

The method for measuring the TREF in the present invention is described in the following. The sample is added to orthodichlorobenzene (ODCB) which has been treated with an antioxidant (e.g., butylhydroxytoluene) until the concentration of the sample reaches 0.05% by weight, while heating at 135° C. to dissolve the sample. Subsequently, 5 ml of the sample solution is introduced into a column packed with glass beads, and cooled to 25° C. at a cooling rate of 0.1° C./minute to deposit the sample onto the surface of the glass beads. Thereafter, the sample is successively eluted while pouring the ODCB through the column at a fixed flow amount and increasing the column temperature at a fixed rate of 50° C/hr. At this time, the concentration of the sample to be eluted into the solvent is continuously detected by means of measuring the absorption at a wave number of 2925 cm$^{-1}$ of the asymmetric stretching vibration of the methylene by means of an infrared detector. From this value, the quantitative analysis concentration of the ethylene α-olefin copolymer is performed, and the relationship between the elution temperature and elution rate is obtained. According to the TREF analysis, it is possible to continuously analyze the change of elution rate, and thus it is also possible to detect relatively fine peaks which were undetectable according to fraction methods.

In addition, the ethylene copolymer (A) according to the present invention possesses one or two melting point peaks, and among these the highest melting point $T_{m1}$ and said density d follow the relationship described by formula c (v).

$T_{ml} \geq 150 \times d - 17$ (Formula c)

If the melting point $T_{m1}$ and density d do not satisfy the relationship expressed in the aforementioned (formula c), an inferior thermal resistance results. The ethylene polymer manufactured by means of using a conventional metallocene catalyst disclosed in Japanese Patent Application, First Publication No. Hei 6-509905, and the like, does not satisfy this requisite condition (v).

The electrical activation energy of the ethylene copolymer (A) according to the present invention is preferably 0.4 eV or less (vi), more preferably 0.3 eV or less, and even more preferably 0.25 eV or less. If the electrical activation energy exceeds 0.4 eV, the quantity and mobility of charged carriers such as ion and electron dramatically increases with increases in the temperature, resulting in a degradation of the thermal and chemical stability thereof.

The aforementioned value is an extremely small value, however, when compared with conventional polyethylene materials. It is thus considered that the ethylene copolymer (A) according to the present invention possess a specific structure such that quantity and mobility of charged carriers contained therein have little influence on the temperature.

Here, the activation energy is one of the constants incorporated into the Arrhenius' equation for expressing the change of rate constant with temperature during the process of the transport phenomenon. This activation energy correlates with the difference in energy between the transition state and original system in the process toward the produced system from the original system via the transition state. In particular, the electrical activation energy is used in the Arrhenius' equation for expressing the temperature dependence of the electric current. A small electrical activation energy reflects a small temperature dependence of the electric current.

The electrical activation energy (U) according to the present invention can be determined from the following equation (Arrhenius' equation).

$$I \exp(-U/kT)$$

(I: electric current, k: Boltzmann's constant, T: absolute temperature)

According to the aforementioned equation, the electrical activation energy can be obtained by means of entering the electric current values at room temperature (20° C.) and at 90° C.

Furthermore, the ethylene copolymer (A) according to the present invention preferably satisfies the condition (vii).

(vii) the melt tension (MT) and melt flow rate (MFR) follow the relationship shown by formula d.

$$\log MT \leq -0.572 \times \log MFR + 0.3 \quad \text{(Formula d)}$$

A melt tension (MT) and melt flow rate (MFR) satisfy the relationship by formula d, an excellent processability results.

The ethylene copolymer (A) according to the present invention has a molecular weight distribution that is broader than the ethylene copolymer obtained under the presence of a typical, conventional metallocene catalyst, i.e., at least one type of catalyst-containing ligand possessing a cyclopentadienyl structure and compound containing transition metal from group IV of the Periodic Table. In addition, the ethylene copolymer (A) according to the present invention possesses superior low temperature forming properties compared with a low density ethylene α-olefin copolymer obtained using a Ziegler-type catalyst, and hence clearly differs from the aforementioned ethylene copolymers.

The ethylene copolymer (A) according to the present invention is not particularly limited with respect to the catalyst and manufacturing method used, as long as it satisfies the aforementioned specific conditions; however, the ethylene copolymer (A) according to the present invention preferably is obtained by means of copolymerizing ethylene and $C_{4-12}$ α-olefin under the presence of a catalyst comprising a cyclic organic compound containing at least a conjugated double bond, and a compound containing transition metal from group IV of the Periodic Table. By means of using this type of catalyst, the aforementioned specific conditions can be easily satisfied.

When the ethylene copolymer (A) according to the present invention is obtained by means of polymerization under the presence of a catalyst obtained by means of mixing compounds which do not contain a halogen, selected from among the following compounds (a1)~(a4), then the addition of a halogen acceptor becomes unnecessary, resulting in no degradation of the electrical properties, which is particularly preferred. For example, in this manner, it is possible to obtain an ethylene copolymer which satisfies the condition of (vi) an electrical activation energy of no greater than 0.4 eV.

(a1) a compound represented by the general formula of
$$Me^1R^1_p R^2_q (OR^3)_r X^1_{4-p-q-r}$$
(wherein, $Me^1$ represents zirconium, titanium, or hafnium; $R^1$ and $R^3$ each respectively represents a $C_{1-24}$ hydrocarbon group; $R^2$ represents a 2,4-pentadionate ligand or derivative thereof, a benzoyl methanate ligand, a benzoyl acetanate ligand or derivative thereof; $X^1$ represents a halogen atom; and p, q and r each represent integers satisfying the ranges of $0 \leq p \leq 4$, $0\ q \leq 4$, and $0 \leq r \leq 4$, such that $0 \leq p+q+r4 \leq$, respectively).

(a2) a compound represented by the general formula of
$$Me^2R^4_m (OR^5)_n X^2_{z-m-n}$$
(wherein, $Me^2$ represents an element from groups I~III of the Periodic Table; $R^4$ and $R^5$ each respectively represents a $C_{1-24}$ hydrocarbon group; $X^2$ represents a halogen atom or a hydrogen atom (with the proviso that when $X^2$ represents a hydrogen atom, $Me^2$ is limited to an element from group III of the Periodic Table); z represents the valence of $Me^2$; and m and n each represent integers satisfying the ranges of $0 \leq m \leq z$, and $0 \leq n \leq z$, such that $0 \geq m+n \geq z$, respectively).

(a3) an cyclic organic compound having a conjugated double bond (a4) modified organoaluminumoxy compound containing an Al—O—Al bond and/or boron compound.

In the following, the catalytic component will be described in greater detail.

In the formula of the compound expressed by the general formula $Me^1R^1_p R^2_q (OR^3)_r X^1_{p-r-q}$ of the aforementioned catalyst component (a1), $Me^1$ represents zirconium, titanium, or hafnium. The kind of such a transition metal is not particularly limited, and may also be used in combinations of two or more. Among the aforementioned, zirconium, which is able provide a copolymer superior in weather resistance, is particularly preferred. $R^1$ and $R^3$ each represent a $C_{1-24}$ hydrocarbon group, preferably $C_{1-12}$, and more preferably $C_{1-18}$ hydrocarbon group. Concrete examples may include an alkyl group such as a methyl group, ethyl group, propyl group, isopropyl group, butyl group, and the like; an alkenyl group such as a vinyl group, allyl group, and the like; and aryl group such as a phenyl group, tolyl group, xylyl group, mesityl group, indenyl group, naphthyl group, and the like; and an aralkyl group such as a benzyl group, trityl group, phenethyl group, styryl group, benzhydryl group, phenylbutyl group, neophyl group, and the like. These aforementioned compounds may also be branched. $R^2$ represents a 2,4-pentanedionate ligand or derivative thereof, a benzoyl methanate ligand, or a benzoyl acetonate ligand or derivative thereof; $X^1$ represents a halogen atom such a fluorine, iodine, chlorine, bromine, and the like; and p, q and r each represent integers satisfying the ranges of $0 \leq p \leq 4$, $0 \leq q \leq 4$ and $0 \leq r \leq 4$, such that $0 \leq p+q+r \leq 4$, respectively.

Examples of the compounds expressed by the general formula of the aforementioned catalyst component (aB) may include tetramethyl zirconium, tetraethyl zirconium, tetrabenzyl zirconium, tetrapropoxy zirconium, tripropoxy monochloro zirconium, tetraethoxy zirconium, tetrabutoxy zirconium, tetrabutoxy titanium, tetrabutoxy hafnium, and the like. Among these, $Zr(OR)_4$ compounds such as tetrapropoxy zirconium, tetrabutoxy zirconium, and the like, are particularly preferred, and a mixture of two or more types may also be used. In addition, concrete examples of the complex containing the aforementioned 2,4-pentanedionate ligand or derivative thereof, benzoyl methanate ligand, and benzoyl acetonate ligand or derivative thereof may include zirconium tetra(2,4-pentanedionate), zirconium tri(2,4-pentanedionate) chloride, zirconium di(2,4-pentanedionate) dichloride, zirconium (2,4-pentanedionate) trichloride, zirconium di(2,4-pentanedionate) diethoxide, zirconium di(2,4-pentanedionate) di-n-propoxide, zirconium di(2,4-pentanedionate) di-n-butoxide, zirconium di(2,4-pentanedionate) dibenzyl, zirconium di(2,4-pentanedionate) dineophyl, zirconium tetra(dibenzoyl methanate), zirconium di(dibenzoyl methanate) diethoxide, zirconium di(dibenzoyl methanate) di-n-propoxide, zirconium di(dibenzoyl methanate) di-n-butoxide, zirconium di(benzoyl acetonate) diethoxide, zirconium di(benzoyl acetonate) di-n-propoxide, zirconium di(benzoyl acetonate) di-n-butoxide, and the like.

In the formula of the compound expressed by the general formula $Me^2R^4{}_m(OR^5)_nX^2{}_{z-m-n}$ of the aforementioned catalyst component (a2), $Me^2$ represents an element from groups I~III of the Periodic Table; examples of which include lithium, sodium, potassium, magnesium, calcium, zinc, boron, aluminum, and the like. $R^4$ and $R^5$ each respectively represents a $C_{1-24}$ hydrocarbon group, preferably $C_{1-12}$, and more preferably $C_{1-8}$ hydrocarbon group. Concrete examples may include an alkyl group such as a methyl group, ethyl group, propyl group, isopropyl group, butyl group, and the like; an alkenyl group such as a vinyl group, allyl group, and the like; aryl group such as phenyl group, tolyl group, xylyl group, mesityl group, indenyl group, naphthyl group, and the like; and an aralkyl group such as a benzyl group, trityl group, phenethyl group, styryl group, benzhydryl group, phenylbutyl group, neophyl group, and the like. These aforementioned compounds may also be branched. $X^2$ represents a hydrogen atom or a halogen atom such as fluorine, iodine, chlorine, bromine and the like. When $X^2$ represents a hydrogen atom, $Me^2$ is limited to an element from group III of the Periodic Table such as boron, aluminum. In addition, z represents the valence of $Me^2$; and m and n each represent integers satisfying the ranges of $0 \leq m \leq z$, and $0 \leq n \leq z$, such that $0 \leq m+n \leq z$, respectively.

Examples of the compound expressed by the general formula of the aforementioned catalyst component (a2) may include organic lithium compounds such as methyl lithium, ethyl lithium, and the like; organic magnesium compounds such as dimethyl magnesium, diethyl magnesium, methyl magnesium chloride, ethyl magnesium chloride, and the like; organic zinc compound such as dimethyl zinc, diethyl zinc, and the like; organic boron compounds such as trimethyl boron, triethyl boron, and the like; and derivatives of organoaluminum compounds and the like such as trimethyl aluminum, triethyl aluminum, tripropyl aluminum, triisobutyl aluminum, trihexyl aluminum, tridecyl aluminum, diethyl aluminum chloride, ethyl aluminum dichloride, ethyl aluminum sesquichloride, diethyl aluminum ethoxide, diethyl aluminum hydride, and the like.

The cyclic organic compound having a conjugated double bond of the aforementioned catalyst component (a3) contains a $C_{4-24}$, preferably $C_{4-12}$ cyclic hydrocarbon compound comprising at least one ring containing two or more conjugated double bonds, preferably two to four conjugated double bonds, and more preferably two or three conjugated double bonds; a cyclic hydrocarbon compound, wherein a portion of the aforementioned cyclic hydrocarbon compound is substituted with one to six residual hydrocarbon groups, (typically, with $C_{1-12}$ alkyl group or aralkyl group); an organic silicon compound containing $C_{4-24}$, preferably $C_{4-12}$ cyclic hydrocarbon group, and comprising two or more conjugated double bonds, preferably two to four conjugated double bonds, and more preferably two or three conjugated double bonds; and an organic silicon compound, wherein a portion of the aforementioned cyclic hydrocarbon is substituted with one to six hydrocarbon residues or alkali metal salt (such as sodium or lithium salt). In particular, cyclic organic compounds having cyclopentadiene structure anywhere in its molecule are preferred.

Preferred examples of the aforementioned compound may include cyclopentadiene, indene, azulene, as well as alkyl, aryl, aralkyl, alkoxy, or aryloxy derivatives thereof. In addition, compounds in which these aforementioned compounds are bonded (cross-linked) via alkylene group (normally $C_{2-8}$, preferably $C_{2-3}$ alkylene group), may be suitably used.

The organic silicon compound having a cyclic hydrocarbon group may be expressed by the following general formula.

$$A_LSiR_{4-L}$$

Here, A represents the aforementioned cyclic hydrocarbon group such as a cyclopentadienyl group, substituted cyclopentadienyl group, indenyl group, and substituted indenyl group; R represents a hydrogen atom or $C_{1-24}$, preferably $C_{1-12}$ hydrocarbon residue such as alkyl group such as a methyl group, ethyl group, propyl group, isopropyl group, butyl group, and the like; an alkoxy group such as a methoxy group, ethoxy group, propoxy group, butoxy group, and the like; an aryl group such as a phenyl group, and the like; an aryloxy group such as a phenoxy group, and the like; or an aralkyl group such as a benzyl group, and the like; and L satisfies $1 \leq L < 4$, preferably $1 \leq L < 3$.

Concrete examples of the cyclic organic hydrocarbon compound of the aforementioned component (a3) include $C_{5-24}$ cyclopolyene or substituted cyclopolyene such as cyclopentadiene, methylcyclopentadiene, ethylcyclopentadiene, 1,3-dimethylcyclopentadiene, indene, 4-methyl-1-indene, 4,7-dimethylindene, cycloheptatriene, methylcycloheptatriene, cyclooctatetraene, azulene, fluorene, and methyl fluorene; monocyclopentadienyl silane; biscyclopentadienyl silane; tricyclopentadienyl silane; monoindenyl silane; bisindenyl silane; trisindenyl silane; and the like.

The modified organoaluminumoxy compound containing an Al—O—Al bond of the catalyst component (a4) is normally a modified organoaluminumoxy compound referred to as "aluminoxane", which can be obtained by means of reacting an alkyl aluminum compound with water, and contains normally 1 to 100 Al—O—Al bonds, preferably 1 to 50 Al—O—Al bonds, in a molecule. In addition, the modified organoaluminumoxy compound containing an Al—O—Al bond may comprise either a linear or cyclic structure.

The reaction of the organic aluminum compound with water is normally performed in an inactive hydrocarbon, preferred examples of which include aliphatic, alicyclic, and aromatic hydrocarbons such as pentane, hexane, heptane, cyclohexane, benzene, toluene, xylene, and the like.

The reaction ratio of the water and organic aluminum compound (water to Al ratio in mol) is normally 0.25/1~1.2/1, and preferably 0.5/1~1/1.

Examples of the boron compound may include triethylaluminum tetra(pentafluorophenyl) borate, triethylammonium tetra(pentafluorophenyl) borate, dimethylanilinium tetra(pentafluorophenyl) borate, dimethylanilinium tetra(pentafluorophenyl) borate, butylammonium tetra (pentafluorophenyl)borate, N,N-dimethylanilinium tetra (pentafluorophenyl) borate, N,N-dimethylanilinium tetra(3, 5-difluorophenyl) borate, and the like.

The aforementioned catalyst components (a1) to (a4) may be mixed into contact and used. These components are preferably supported on an inorganic carrier and/or particulate polymer carrier (a5), and are used.

Examples of the aforementioned inorganic carrier and/or particulate polymer carrier (a5) may include carbon material, metal, metallic oxide, metallic chloride, metallic carbonate, and mixtures thereof, thermoplastic resins, or thermosetting resins, and the like. Preferred examples of the metal that can be used as inorganic carrier includes iron, aluminum, nickel, and the like.

Concrete examples of the aforementioned may include $SiO_2$, $Al_2O_3$, MgO, $ZrO_2$, $TiO_2$, $B_2O_3$, CaO, ZnO, BaO, $ThO_2$, and the like, and mixtures thereof, including $SiO_2$—$Al_2O_3$, $SiO_2$—$V_2O_5$, $SiO_2$—$TiO_2$, $SiO_2$—$V_2O_5$, $SiO_2$—MgO, $SiO_2$—$Cr_2O_3$, and the like. Among the aforementioned, those compounds possessing a main component which comprises at least one component selected from among the group comprising $SiO_2$ and $Al_2O_3$, are preferred.

In addition, either a thermoplastic resin or thermosetting resin may be used as the aforementioned organic compound, concrete examples of which may include a particulate polyolefin, polyester, polyamide, poly(vinyl chloride), poly (methyl (meth)acrylate), polystyrene, polynorbornene, various natural high polymer, mixtures thereof, and the like.

The aforementioned inorganic carrier and/or particulate polymer carrier may be used in its intrinsic state "as is", but is preferably used as a component a5 after contact treatment with an organic aluminum compound, modified organic aluminum compound containing Al—O—Al bonds, and the like, as preliminary treatment.

The ethylene copolymer (A) employed in the present invention may be manufactured such that the halogen concentration is 10 ppm or less, preferably 5 ppm or less, and more preferably, substantially none (2 ppm or less), by means of using an aforementioned catalyst which does not contain a halogen such as chlorine or the like, in these components.

By means of using this type of ethylene copolymer (A) which is free of halogen such as chlorine and the like, it becomes unnecessary to add additives and the like, such as a halogen acceptor, which negatively impact the dielectric loss tangent, and the like.

The method for manufacturing the ethylene copolymer (A) employed in the present invention includes a gas phase polymerization, wherein the solvent does not exist in substantial amounts, slurry polymerization, solution polymerization, and the like, in the presence of the aforementioned catalyst. Herein, the ethylene copolymer (A) is manufactured with essentially no oxygen, water, or the like, in the presence or absence of an inactive hydrocarbon solvent including aliphatic hydrocarbons such as butane, pentane, hexane, heptane, and the like, aromatic hydrocarbons such as benzene, toluene, xylene, and the like, and alicyclic hydrocarbons such as cyclohexane, methylcyclohexane, and the like. The polymerization conditions in the aforementioned are not particularly limited. However, the polymerization temperature is normally 15 to 350° C., preferably 20 to 200° C., and more preferably 50 to 110° C. The polymerization pressure is normally in the range of normal pressure to 70 kg/cm²G, and preferably normal pressure to 20 kg/cm²G, in the low or medium pressure process. In addition, the polymerization pressure is normally 1500 kg/cm²G or less in the high pressure process. The duration of polymerization is normally 3 minutes to 10 hours, and preferably 5 minutes to 5 hours, in the low or medium pressure process. This duration of polymerization is normally 1 to 30 minutes, and preferably 2 to approximately 20 minutes, in the high pressure process. In addition, the method for polymerization is not particularly limited, and includes multi-step polymerization comprising two or more steps, in which the polymerization conditions such as the hydrogen concentration, monomer concentration, polymerization pressure, polymerization temperature, catalyst, and the like, differ in each step. In addition, the method of polymerization may also include a one-step polymerization method.

The resin material for an electrical insulating material according to the present invention comprises the resin component comprising mainly the aforementioned ethylene copolymer (A), and said resin component contains at least one unit (B) derived from at least one type of monomer selected from among a carbonyl or carbonyl derivative group-containing monomer (M1), a hydroxyl group-containing monomer (M2), a nitro group-containing monomer (M3), a nitrile group-containing monomer (M4), and an aromatic ring-containing monomer (M5), wherein the concentration thereof ranges from $5\times10^{-7}$ to $5\times10^{-3}$ mol per one gram of the resin component; or said resin component comprises a copolymer or composition which contains a compound or monomer containing two or more ethylenic linkages (M6), wherein at least 0.8 ethylenic bonds are present per 1000 carbon atoms of the resin component.

Concrete examples of the aforementioned carbonyl or carbonyl derivative group-containing monomer (M1) may include unsaturated carbonic acids derived from α,β-unsaturated carbonic acid, unsaturated carbonate esters derived from α,β-unsaturated carbonate ester, vinyl ester monomers, and the like.

Concrete examples of the aforementioned unsaturated carbonic acid may include, for example, acrylic acid, methacrylic acid, maleic acid, fumaric acid, itaconic acid, and the like. Among the aforementioned, (meth)acrylic acid is effective in improving the volume resistivity, and is thus preferred. Concrete examples of the unsaturated carbonate ester may include unsaturated carbonate esters such as methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, lauryl acrylate, lauryl methacrylate, stearyl acrylate, stearyl methacrylate, maleate monomethylester, maleate monoethylester, maleate diethylester, fumarate monomethylester, glycidyl acrylate, glycidyl methacrylate, and the like.

Concrete examples of the aforementioned vinyl ester may include vinyl propionate, vinyl acetate, vinyl capronate, vinyl caprylate, vinyl laurylate, vinyl stearate, vinyl trifluoroacetate, and the like. Among the aforementioned, vinyl acetate is preferred.

Examples of the acid anhydride group-containing monomer, which is a carbonyl derivative group-containing monomer, may include maleic anhydride, itaconic anhydride, himic anhydride, methylmaleic anhydride, dimethylmaleic anhydride, phenylmaleic anhydride, diphenylmaleic anhydride, chloromaleic anhydride, dichloromaleic anhydride, fluoromaleic anhydride, difluoromaleic anhydride, bromomaleic anhydride, dibromomaleic anhydride, and the like. Among the aforementioned, maleic anhydride is particularly preferred due to its effectiveness in improving the volume resistivity.

Examples of the aforementioned other monomers may include carbon monoxide, methylvinyl ketone, isopropenylvinyl ketone, ethylvinyl ketone, phenylvinyl ketone, t-butylvinyl ketone, isopropylvinyl ketone, methylpropenyl ketone, methylisopropenyl ketone, cyclohexylvinyl ketone, and the like.

Examples of the hydroxyl group-containing monomer (M2) may include vinyl alcohol, 1-hydroxypropyl (meth)acrylate, 2-hydroxypropyl (meth)acrylate, hydroxyethyl (meth)acrylate, and the like.

Examples of the nitro group-containing monomer (M3) may include 2,4-dinitrophenylacrylate, 2-nitrostyrene, m-nitrostyrene, o-nitrostyrene, p-nitrostyrene, p-nitrophenylmethacrylate, m-nitrophenylmethacrylate, 2,4-dinitrophenylmethacrylate, 2,4,6-trinitrophenylmethacrylate, and the like.

Examples of the nitrile group-containing monomer (M4) may include acrylonitrile, methacrylonitrile, α-methoxyacrylonitrile, vinylidene cyanide, cinammonitrile, crotononitrile, α-phenyl crotononitrile, fumaronitrile, allylacetonitrile, 2-butenenitrile, 3-butenenitrile, and the like.

The aromatic ring-containing monomer (M5) is a compound containing a monocyclic or polycyclic aromatic ring, which comprises a monomer containing an ethylenic linkage.

The aforementioned aromatic ring-containing monomer is preferably a compound comprising an aromatic group, containing 1 to 3 rings, concrete examples of which may include styrene or derivatives thereof, allylbenzene, allyl biphenyl, methylstyrene, allyl benzonate, vinylnaphthalene, 4-phenyl-1-butene, benzyl methacrylate, 1,1-diphenylethylene, 1-phenyl-1-tolylethylene, 1-phenyl-1-styril ethane, 1-tolyl-1-styril ethane, 2,4-diphenyl-1-butene, 2,4-diphenyl-1-pentene, 2,4-diphenyl-4-methyl-1-pentene, and the like.

Among the aforementioned, styrene is preferred in the present invention due to its favorable electrical properties and economical nature.

The amount of these monomers, (M1) to (M5), should be in the range of $5 \times 10^{-7}$ to $5 \times 10^{-3}$ mol, and preferably $1 \times 10^{-6}$ to $1 \times 10^{-4}$ mol, per one gram of the resin component.

In particular, when these monomers (M1) to (M4) such as maleic anhydride or the like fall below the range of $5 \times 10^{-7}$ mol, improvements in the volume resistivity are not possible. In addition, in the case of (M5), improvement in the dielectric breakdown strength is likewise not observed. Furthermore, when the aforementioned monomers exceed $5 \times 10^{-3}$ mol, the processability deteriorates and the volume resistivity drops, both of which are undesirable.

Concretely, the respective methods for introducing these aforementioned monomers (M1) to (M5) into the resin components are performed by means of the methods described by (C) or (D) below.

(C): The resin component comprises at least one entity selected from among (C1) to (C3), or alternatively comprises blending at least one of the aforementioned into the resin component.

(C1) a graft copolymer obtained by means of modifying an ethylene copolymer (A) using at least one monomer selected from (M1) to (M4).

(C2) a graft copolymer obtained by means of modifying another polyolefin (A') using at least one monomer selected from (M1) to (M4).

(C3) a random copolymer comprising ethylene and at least one monomer selected from (M1) to (M4); or a random copolymer comprising ethylene, another olefin and at least one monomer selected from (M1) to (M4).

(D): At least one component selected from among (D1) to (D6) is blended into the resin component.

(D1) a polymer containing an aromatic ring.

(D2) a random copolymer comprising ethylene, at least one monomer selected from (M1) to (M4), and an aromatic ring-containing monomer (M5); or a random copolymer comprising ethylene, another olefin, at least one monomer selected from (M1) to (M4), and an aromatic ring-containing monomer (M5).

(D3) a graft copolymer obtained by means of modifying an ethylene polymer containing an aromatic ring using at least one monomer selected from (M1) to (M4).

(D4) a graft copolymer obtained by means of modifying a random polymer comprising ethylene and at least one monomer selected from (M1) to (M4), or a random copolymer comprising ethylene, another olefin, and at least one monomer selected from (M1) to (M4), using the aromatic ring-containing monomer (M5).

(D5) a graft copolymer obtained by means of modifying the ethylene copolymer (A) using an aromatic ring-containing monomer (M5).

(D6) a graft copolymer obtained by means of modifying the ethylene copolymer (A) using at least one monomer selected from (M1) to (M4) and aromatic ring-containing monomer (M5).

Concrete examples of the aforementioned graft copolymer (C1) obtained by means of modifying the ethylene copolymer (A) using at least one functional group-containing monomer (M1) to (M4) may include a graft copolymer modified using maleic anhydride or acrylic acid. Among these, the maleic anhydride-modified ethylene copolymer (A) is preferably used due to its effectiveness in improving the volume resistivity.

Concrete examples of the graft copolymer (C2) obtained by means of modifying another polyolefin (A') using at least one monomer selected from (M1) to (M4), and the random copolymer (C3) comprising ethylene and at least one monomer selected from (M1) to (M4), or random copolymer (C3) comprising ethylene, another olefin and at least one monomer selected from (M1) to (M4), may include linear low density polyethylenes modified using acrylic acid or maleic anhydride; high and medium density polyethylenes modified using acrylic acid or maleic anhydride; copolymers of ethylene and acrylic acid or maleic anhydride; copolymers of ethylene and carbon monoxide; an ethylene-methylvinyl ketone copolymer; an ethylene-ethylvinyl ketone copolymer; an ethylene-methylisopropenyl ketone copolymer; an ethylene-hydroxyethyl (meth)acrylate copolymer; an ethylene-2-nitrostyrene copolymer; an ethylene-m-nitrostyrene copolymer; an ethylene-p-nitrophenylmethacrylate copolymer; an ethylene-(meth) acrylonitrile copolymer; an ethylene-allylacetonitrile copolymer; a styrene-modified high pressure process low density polyethylene; and the like.

The aforementioned polymer (D1) containing aromatic ring group is a homopolymer comprising a monomer, containing a homocyclic or polycyclic aromatic ring group, copolymer comprising said monomer and olefin, or copolymer comprising said monomer and a monomer containing a functional group.

The aforementioned aromatic ring-containing monomer is preferably an aromatic group compound comprising 1 to 3 rings, concrete examples of which may include styrene or derivatives thereof, allylbenzene, allylbiphenyl, methylstyrene, allyl benzonate, vinylnaphthalene, 4-phenyl-1-butene, benzyl methacrylate, 1,1-diphenylethylene, 1-phenyl-1-tolylethylene, 1-phenyl-1-styril ethane, 1-tryl-1-styril ethane, 2,4-diphenyl-1-butene, 2,4-diphenyl-1-pentene, 2,4-diphenyl-4-methyl-1-pentene, and the like.

Among these aromatic ring group-containing copolymers, polystyrene, ethylene-styrene random copolymers, and styrene-maleic anhydride copolymers are most preferred, due to their ease of manufacturing, and effectiveness in improving the dielectric breakdown strength.

Concrete examples of the aforementioned random copolymer (D2) comprising an ethylene, at least one monomer selected from (M1) to (M4), and an aromatic ring-containing monomer (M5), or a random copolymer (D2) comprising ethylene, another olefin, at least one monomer selected from (M1) to (M4), and the aromatic ring-containing monomer (M5) may include an ethylene-styrene-maleic anhydride random copolymer, and an ethylene-allylbenzene copolymer.

Concrete examples of the copolymer comprising at least one monomer containing a styrene derivative and ethylene may include an ethylene/vinyl acetate/styrene copolymer, an ethylene/vinyl acetate/a-methylstyrene copolymer, an ethylene/ethyl acrylate/styrene copolymer, an ethylene/ethyl acrylate/a-methylstyrene copolymer, and the like.

Concrete examples of the aforementioned graft copolymer (D3) obtained by means of modifying the aforementioned aromatic ring group-containing ethylene copolymer using at least one monomer selected from (M1) to (M4) may include a maleic anhydride-modified ethylene-styrene copolymer, a maleic anhydride-modified ethylene-benzyl methacrylate copolymer, and a maleic anhydride-modified ethylene-allylstyrene copolymer.

Concrete examples of the aforementioned graft copolymer (D4) obtained by means of modifying the aforementioned random copolymer of ethylene and at least one monomer selected from (M1) to (M4), or random copolymer of ethylene, other olefin, and at least one monomer selected from (M1) to (M4), using the aromatic ring-containing monomer (M5) may include styrene-modified ethylene-maleic anhydride copolymer.

Examples of the aforementioned graft olefin copolymer (D5) obtained by means of modifying the ethylene copolymer (A) using the aromatic ring-containing monomer (M5) may include a styrene-modified ethylene copolymer (A), which is easy to manufacture, and effective in improving electrical insulating breakdown strength.

Concrete examples of the aforementioned graft copolymer (D6) obtained by means of modifying the ethylene copolymer (A) using at least one monomer selected from (M1)~(M4), and the aromatic ring-containing monomer (M5) may include an ethylene copolymer (A) modified using maleic anhydride and styrene.

According to the present invention, the mixing amount of at least one component (D), selected from among the polymers containing an aromatic ring group (D1); a random copolymer (D2) comprising ethylene, at least one monomer selected from (M1) to (M4), and the aromatic ring-containing monomer (M5), or random copolymer (D2) comprising ethylene, another olefin, at least one monomer selected from (M1) to (M4), and the aromatic ring-containing monomer (M5); the graft copolymer (D3) obtained by means of modifying an ethylene polymer containing an aromatic group-ring using at least one monomer selected from (M1) to (M4); the graft copolymer (D4) obtained by means of modifying a random polymer comprising ethylene and at least one monomer selected from (M1) to (M4), or random copolymer comprising ethylene, another olefin, and at least one monomer selected from (M1) to (M4), using the aromatic ring-containing monomer (M5); the graft copolymer (D5) obtained by means of modifying the ethylene copolymer (A) using an aromatic ring-containing monomer (M5); the graft copolymer (D6) obtained by means of modifying the ethylene copolymer (A) using at least one monomer selected from (M1) to (M4) and the aromatic ring-containing monomer (M5), is adjusted such that the amount of the aromatic ring-containing monomer in the aforementioned resin components is in the range of $5 \times 10^{-7}$ to $5 \times 10^{-3}$ mol per one gram of the resin component, and preferably $1 \times 10^{-6}$ to $1 \times 10^{-4}$ mol per one gram of the resin component. When the concentration of the aforementioned monomer is less than $5 \times 10^{-7}$ mol, dielectric breakdown strength cannot be improved.

The method for introducing the compound or monomer (M6) containing two or more ethylenic linkages into the resin components according to the present invention comprises a method in which one component selected from among the components described in the following (E1) to (E5) is mixed into the resin component. When introducing a compound or monomer (M6) containing two or more ethylenic linkages into the resin component, it is preferable to use a cross-linked resin material.

(E) comprises at least one component selected from among (E1) to (E5) below:

(E1) a homopolymer comprising a monomer containing two or more ethylenic linkages, or copolymer comprising ethylene and monomer containing two or more ethylenic linkages.

(E2) a graft copolymer obtained by means of modifying a homopolymer comprising a monomer containing two or more ethylenic linkages, or copolymer comprising ethylene and monomer containing two or more ethylenic linkages, using at least one monomer selected from among the aforementioned (M1) to (M5).

(E3) a random copolymer comprising a monomer containing two or more ethylenic linkages and at least one monomer selected from among the aforementioned (M1) to (M5).

(E4) a random copolymer comprising a monomer containing two or more ethylenic linkages, ethylene, and at least one monomer selected from among the aforementioned (M1) to (M5).

(E5) a compound containing two or more ethylenic linkages.

In the aforementioned, by means of employing a homopolymer (E1) comprising a monomer containing two or more ethylenic linkages, or copolymer (E1) comprising ethylene and monomer containing two or more ethylenic linkages, a sufficient number of ethylenic linkages should be present after polymerization. The presence of the aforementioned ethylenic linkages allows for the cross-linking properties to be fully exhibited. Examples of the aforementioned component (E1) may include an liquid oligomer or polymer with an average molecular weight of 1000 to 200000, and the like.

Examples of one of the aforementioned components (E1), the homopolymer comprising a monomer containing two or more ethylenic linkages, may include a polymer comprising a $C_{4-10}$ diene. The diene may comprise either a ring- or straight chain-structure, as long as the ethylenic linkages are relevant to the polymerization. Among such polymers, a butadiene oligomer, and polybutadiene, with an average molecular weight of approximately 1000 to 200000 are most preferred due to their superior electrical insulating properties after cross-linking in addition to their cross-linking efficiency.

Concrete examples of the aforementioned diene may include 1,3-butadiene, 1,3-pentadiene, 1,4-pentadiene, 2-methyl-1,3-butadiene, 1,3-hexadiene, 1,4-hexadiene, 1,5-hexadiene, 2,4-hexadiene, 2,3-dimethyl-1,3-butadiene, 2-ethyl-1,3-butadiene, 1,3-heptadiene, 1,4-heptadiene, 3-(2-propenyl)-cyclopentene, 2-(cyclopentyl)-1,3-butadiene, and the like. In addition, triene and tetraene, which are polymerized from dienes, may also be used. Among these, a homopolymer of 1,3-butadiene is particularly preferred due to its superior cross-linking properties.

Preferred examples of one the aforementioned components (E1), the random copolymer comprising ethylene and a monomer containing two or more ethylenic linkages, may include an ethylene-allyl (meth)acrylate copolymer, an ethylene-vinyl (meth)acrylate copolymer and the like, which are easy to manufacture and superior electrical insulating properties after cross-linking and cross-linking efficiency. These copolymers may also be used in combination of two or more.

Concrete examples of the aforementioned graft copolymer (E2) obtained by means of modifying a homopolymer comprising a monomer containing two or more ethylenic linkages, or copolymer comprising ethylene and monomer containing two or more ethylenic linkages, using at least one monomer selected from among the aforementioned (M1) to (M5); the aforementioned random copolymer (E3) comprising a monomer containing two or more ethylenic linkages and at least one monomer selected from among the aforementioned (M1) to (M5); the aforementioned random copolymer (E4) comprising a monomer containing two or more ethylenic linkages, ethylene, and at least one monomer selected from among the aforementioned (M1) to (M5), may include a polybutadiene modified using acrylic acid or maleic anhydride, a maleic anhydride-modified ethylene-allyl (meth)acrylate copolymer, a maleic anhydride-modified ethylene-vinyl (meth)acrylate copolymer, a maleic anhydride-butadiene copolymer, an ethylene-butadiene-maleic anhydride copolymer, and the like. Among the aforementioned, the maleic anhydride-modified polybutadiene is preferred due to its favorable electrical insulating properties after cross-linking, cross-linking efficiency, and effects in improving the volume resistivity.

Concrete examples of the aforementioned compound (E5) containing two or more ethylenic linkages may include multi-functional methacrylate monomers such as trimethylol propane trimethacrylate, ethylene glycol dimethacrylate, diethylene glycol dimethacrylate, and the like; multifunctional vinyl monomers such as triallyl isocyanurate, diallylphthalate, vinylbutyrate, and the like; bismaleimides such as N,N'-m-phenylene bismaleimide, and N,N'-ethylene bismaleimide; dioximes such as p-quinone dioxime, and the like; divinyl compounds such as divinyl benzene, 1,5-hexanediene-3-ine, hexatriene, divinyl ether, divinyl sulfone, and the like; and diallyl compounds such as allyl styrene, 2,6-diacrylphenol, diallyl carbinol, and the like.

The mixing amount of at least one the component (M6), selected from among the homopolymer (E1) comprising a monomer containing two or more ethylenic linkages, or copolymer (E1) comprising ethylene and monomer containing two or more ethylenic linkage; the graft copolymer (E2) obtained by means of modifying a homopolymer comprising a monomer containing two or more ethylenic linkages, or copolymer comprising ethylene and monomer containing two or more ethylenic linkages, using at least one monomer selected from among the aforementioned (M1) to (M5); the random copolymer (E3) comprising a monomer containing two or more ethylenic linkages and at least one monomer selected from among the aforementioned (M1) to (M5); the random copolymer (E4) comprising a monomer containing two or more ethylenic linkages, ethylene, and at least one monomer selected from among the aforementioned (M1) to (M5); and the compound (E5) containing two or more ethylenic linkages, is adjusted such that the number of the ethylenic linkages present prior to cross-linking is 0.8 or more per 1000 carbon atoms in the resin composition. The aforementioned number of the ethylenic linkages is preferably in the range of 0.8 to 4.0 per 1000 carbon atoms. For example, in the high pressure process low density polyethylene, a large number of these ethylenic linkages is generally present even if the component (M6) is not blended. Accordingly, the number of the ethylenic linkages is the overall total of these ethylenic linkages.

The aforementioned ethylenic linkages function as cross-linking points at the time of performing cross-linking, and hence they improving the cross-linking efficiency. In addition, at the time of cross-linking, the residues of the cross-linking agent are incorporated into the main chain. The residues floating in the resin components are broken down via ions formed by means of both thermal and electrical fields, thereby acquiring charges, which in turn lead to a reduction of the volume resistivity. Consequently, by means of taking in these residues into the main chain, the aforementioned effects are prevented, which in turn improves the volume resistivity.

If the number of the aforementioned ethylenic linkages is less than 0.8 per 1000 carbon atoms, the cross-linking efficiency is not improved; on the other hand, a number exceeding 4.0 per 1000 carbon atoms leads to excessive cross-linking, and deterioration of the mechanical properties and processability thereof.

In addition, among these ethylenic linkages, it is particularly preferred that the number of terminal vinyl groups is in the range of 0.5 to 3.0, due to improvements in cross-linking efficiency.

When using a graft modified (co)polymer for introducing the aforementioned component (B) into the resin component, the graft modified (co)polymer is manufactured in the presence of a radical initiator, according to a melting method wherein the (co)polymer is reacted within the extrusion device, and a solution method wherein the (co)polymer is reacted in a solution, or the like.

Examples of the radical initiator may include organic peroxides, dihydro aromatic compounds, dicumyl compounds, and the like.

Preferred examples of the aforementioned organic peroxide may include hydroperoxide, dicumyl peroxide, t-butylcumyl peroxide, dialkyl(allyl) peroxide, diisopropylbenzene hydroperoxide, dipropionyl peroxide, dioctanoyl peroxide, benzoyl peroxide, peroxy succinate, peroxy ketal, 2,5-dimethyl-2,5-di-(t-butylperoxy) hexane, 2,5-dimethyl-2,5-di-(t-butylperoxy) hexine, t-butylperoxy acetate, t-butylperoxy isobutylate, and the like.

Examples of the dihydro aromatic compounds may include hydroquinoline, derivatives thereof, dihydrofuran, 1,2-dihydrobenzene, 1,2-dihydronaphthalene, 9,10-dihydrophenanthrene, and the like.

Examples of the dicumyl compound may include 2,3-dimethyl-2,3-diphenylbutane, 2,3-diethyl-2,3-diphenylbutane, 2,3-diethyl-2,3-di(p-methylphenyl)butane, 2,3-diethyl-2,3-di(bromophenyl)butane, and the like. Among the aforementioned compounds, 2,3-dimethyl-2,3-diphenylbutane is particularly preferred.

The resin component according to the present invention may contain other polyolefins (A'), in addition to the aforementioned ethylene copolymer (A). In such cases, the resin component preferably contains 2% by weight or greater of the ethylene copolymer (A), and 98% by weight or less of the other polyolefin (A').

Examples of the other polyolefin (A') employed in the present invention may include an ethylene (co)polymers obtained by means of the high pressure radical polymerization; ethylene polymers such as very low density polyethylene, linear low density polyethylene, medium to high density polyethylene, and the like, which may be obtained under low, medium, or high pressure by means of using a Ziegler catalyst, a Phillips catalyst, other metallocene catalyst, or the like; a homopolymer or alternating copolymer of $C_{3-12}$ α-polyolefin; and the like. Among the aforementioned polymers, polyethylenes obtained by means of the high pressure radical polymerization, medium to high density polyethylenes, linear low density polyethylenes, and mixtures of two or more of these polyethylenes, are particularly preferred due to their favorable extrusion-forming properties.

Examples of the other polyolefin (A') employed in the present invention may include an ethylene (co)polymers obtained by means of the high pressure radical polymerization; ethylene polymers such as very low density polyethylene, linear low density polyethylene, medium to high density polyethylene, and the like, which may be obtained under low, medium, or high pressure by means of using a Ziegler catalyst, a Phillips catalyst, other metallocene catalyst, or the like; a homopolymer or alternating copolymer of $C_{3-12}$ α-olefin and the like. Among the aforementioned polymers, polyethylenes obtained by means of the high pressure radical polymerization, medium to high density polyethylenes, linear low density polyethylenes, and mixtures of two or more of the polyethylenes, are particularly preferred due to their favorable extrusion-forming properties.

The aforementioned medium to high density polyethylenes and linear low density polyethylenes comprise an ethylene homopolymer or ethylene α-olefin copolymer possessing a density of 0.86 to 0.97 g/cm³, i.e., an ethylene homopolymer or ethylene $C_{3-12}$ α-olefin copolymer obtained by means of using a Ziegler catalyst, a Phillips catalyst, or other metallocene catalyst according to the low, medium, or high pressure process, or alternatively another conventional method.

Concrete examples of the α-olefin used in the aforementioned polymerization may include propylene, 1-butene, 4-methyl-1-pentene, 1-hexene, 1-octene, 1-dodecene, and the like. Among the aforementioned compounds, preferred examples include 1-butene, 4-methyl-1-pentene, 1-hexene, and 1-octene. Furthermore, 1-butene is particularly preferred. The amount of α-olefin in the ethylene copolymer is preferably 0.5 to 40 mol %.

Concrete examples of the preferred combinations in the present invention are described in the following.

<Preferred Example 1> a graft copolymer (C11) obtained by means of modifying the ethylene copolymer (A) using a functional group-containing monomer (M1). Concrete examples include a maleic anhydride-modified ethylene copolymer (A).

<Preferred Example 2> a composition of the ethylene copolymer (A); and a graft copolymer (C11) obtained by means of modifying the ethylene copolymer (A) using the functional group-containing monomer (M1), and/or a graft copolymer (C21) obtained by means of modifying the other polyolefin (A') using the functional group-containing monomer (M1). Concrete examples may include a composition of the ethylene copolymer (A); and the maleic anhydride-modified ethylene copolymer (A), and/or maleic anhydride-modified low density polyethylene.

<Preferred Example 3> a composition of the other polyolefin (A'), and the graft copolymer (C11) obtained by means of modifying the ethylene copolymer (A) using the functional group-containing monomer (M1). Concrete examples may include a composition of a low-density polyethylene and the maleic anhydride-modified ethylene copolymer (A).

<Preferred Example 4> a composition of the ethylene copolymer (A); the other polyolefin (A'); and the graft copolymer (C11) obtained by means of modifying the ethylene copolymer (A) using the functional group-containing monomer (M1), and/or the graft copolymer (C21) obtained by means of modifying the other polyolefin (A') using the functional group-containing monomer (M1). Concrete examples may include a composition of the ethylene copolymer (A); low density polyethylene; and the maleic anhydride-modified ethylene copolymer (A), and/or maleic anhydride-modified low density polyethylene.

<Preferred Example 5> a composition of the ethylene copolymer (A), and a graft copolymer (E21) obtained by means of modifying a homopolymer comprising two or more ethylenic linkages, using the functional group-containing monomer (M1). Concrete examples may include a composition of the ethylene copolymer (A) and maleic anhydride-modified liquid polybutadiene.

<Preferred Example 6> a composition of the ethylene copolymer (A), the other polyolefin (A'), and the graft copolymer (E21) obtained by means of modifying a homopolymer comprising two or more ethylenic linkages, using the functional group-containing monomer (M1). Concrete examples may include a composition of the ethylene copolymer (A), low-density polyethylene, and maleic anhydride-modified liquid polybutadiene.

<Preferred Example 7> a composition of the graft copolymer (C11) obtained by means of modifying the ethylene copolymer (A) using the functional group-containing monomer (M1), and the homopolymer (E11) comprising a monomer containing two or more ethylenic linkages. Concrete examples may include a composition of the maleic anhydride-modified ethylene copolymer (A), and liquid polybutadiene.

<Preferred Example 8> a composition of the ethylene copolymer (A); the graft copolymer (E21) obtained by means of modifying a homopolymer comprising a monomer containing two or more ethylene linkages, using the functional group-containing monomer (M1); and the graft copolymer (C11) obtained by means of modifying the ethylene copolymer (A) using the functional group-containing monomer (M1), and/or the graft copolymer (C21) obtained by means of modifying an olefin polymer using the functional group-containing monomer (M1). Concrete examples may include a composition of the ethylene copolymer (A); maleic anhydride-modified liquid polybutadiene; and the maleic anhydride-modified ethylene copolymer (A), and/or maleic anhydride-modified low density polyethylene.

<Preferred Example 9> a composition of ethylene copolymer (A); other polyolefin (A'); the graft copolymer (E21)

obtained by means of modifying the homopolymer comprising a monomer containing two or more ethylenic linkages; and the graft copolymer (C11) obtained by means of modifying the ethylene copolymer (A) using the functional group-containing monomer (M1), and/or the graft copolymer (C21) obtained by means of modifying the olefin polymer using the functional group-containing monomer (M1). Concrete examples may include a composition of the ethylene copolymer (A); low density polyethylene; maleic anhydride-modified liquid polybutadiene; and the maleic anhydride-modified ethylene copolymer (A), and/or maleic anhydride-modified low density polyethylene.

<Preferred Example 10> a composition of the ethylene copolymer (A); the compound (E5) containing two or more ethylenic linkages; and the graft copolymer (C11) obtained by means of modifying the ethylene copolymer (A) using the functional group-containing monomer (M1), and/or the graft copolymer (C21) obtained by means of modifying the other polyolefin (A') using the functional group containing monomer (M1). Concrete examples may include a composition of the ethylene copolymer (A); divinylbenzene; and the maleic anhydride-modified ethylene copolymer (A), and/or maleic anhydride-modified low density polyethylene.

<Preferred Example 11> a composition of the ethylene copolymer (A); the other polyolefin (A'); the compound (E5) containing two or more ethylenic linkages; and the graft copolymer (C11) obtained by means of modifying the ethylene copolymer (A) using the functional group-containing monomer (M1), and/or the graft copolymer (C21) obtained by means of modifying the other polyolefin (A') using the functional group containing monomer (M1). Concrete examples may include a composition of the ethylene copolymer (A); low density polyethylene; divinylbenzene; and the maleic anhydride-modified ethylene copolymer (A), and/or maleic anhydride-modified low-density polyethylene.

<Preferred Example 12> a composition of the ethylene copolymer (A) and the aromatic ring-containing polymer (D1). Concrete examples may include the ethylene copolymer (A), and the ethylene-styrene random copolymer (D1).

<Preferred Example 13> a composition of the ethylene copolymer (A), the graft copolymer (E21) obtained by means of modifying a homopolymer comprising a monomer containing two or more ethylene linkages, using the functional group-containing monomer (M1), and the aromatic ring-containing polymer (D1). Concrete examples may include the ethylene copolymer (A), maleic anhydride-modified liquid polybutadiene, and the ethylene-styrene random copolymer.

<Preferred Example 14> a composition of the graft copolymer (C11) obtained by means of modifying the ethylene copolymer (A) using the functional group-containing monomer (M1), and the aromatic ring-containing polymer (D1), or, additionally, the graft copolymer (C21) obtained by means of modifying the other polyolefin (A') using the functional group-containing monomer (M1). Concrete examples may include a composition of the maleic anhydride-modified ethylene copolymer (A), and an ethylene-styrene random copolymer.

<Preferred Example 15> a composition of the ethylene copolymer (A), the aromatic ring-containing polymer (D1), and the graft copolymer (D31) obtained by means of modifying an olefin polymer containing an aromatic ring group using the functional group-containing monomer (M1). Concrete examples may include a composition of the ethylene copolymer (A), an ethylene-styrene random copolymer, and an ethylene-styrene-maleic anhydride random copolymer or maleic anhydride-modified ethylene-styrene copolymer.

When using the aforementioned resin material for an electrical insulating material as an electrical insulating material in the present invention, the resin material for an electrical insulating material may be used in its intrinsic state "as is", however, it is preferable to cross-link the resin material for an electrical insulating material in order to further improve the thermal resistance and mechanical strength. The method for cross-linking is not particularly limited, and cross-linking may be performed by means of a radical generator such as organic peroxide, and the like, electron beam cross-linking, silane cross-linking, and the like. Among the aforementioned methods, the method in which a radical generator such as organic peroxide, and the like, is preferred due to its economical nature. In this method, it is particularly preferred that the aforementioned ethylenic linkages are present in the resin component, due to their improved cross-linking efficiency.

Examples of the aforementioned radical generator may include peroxides such as benzoyl peroxide, lauryl peroxide, dicumyl peroxide, t-butylhydro peroxide, $\alpha,\alpha$-bis(t-butylperoxydiisopropyl) benzene, di-t-butyl peroxide, 2,5-dimethyl-2,5-di-(t-butylperoxy) hexane, 2,5-dimethyl-2,5-di-(t-butylperoxy) hexine, azobisisobutylonitrile, and the like; 2,3-dimethyl-2,3-diphenylbutane; 2-3-diethyl-2,3-diphenylbutane; 2,3-diethyl-2,3-di(p-methylphenyl) butane; 2,3-diethyl-2,3-di(bromophenyl) butane; and the like.

In the aforementioned cross-linking, among the aforementioned radical generators, dicumyl peroxide, 2,5-dimethyl-2,5-di-(t-butylperoxy) hexane, 2,5-dimethyl-2,5-di (t-butylperoxy) hexine, and the like, are preferred. In addition, the amount of the aforementioned radical generator used is within the range of 0.01 to 5 parts by weight, and preferably 0.1 to 3 parts by weight, per total 100 parts by weight of the copolymer or its composition.

In the aforementioned cross-linking, it is rather effective to cross-link using the aforementioned radical generator, after mixing a predetermined amount of at least one component selected from among the aforementioned (E1) to (E5) into the resin component, thereby improving the electrical insulating properties such as the volume resistivity and the like, in addition to increasing the aforementioned thermal resistance and mechanical strength.

As the aforementioned cross-linking agent, the same type of agents that are used with the radical generator in graft-modifying the aforementioned monomers (M1) to (M5) into the resin component may be employed. In this case, it is possible to simultaneously blend at least one monomer selected from among (M1) to (M5) and at least one component selected from among (E1) to (E5), and thermally mix them in the presence of the radial generator to simultaneously perform grafting and cross-linking.

In the resin material for an electrical insulating material according to the present invention, it is possible to add an inorganic filler, organic filler, antioxidant, lubricant, organic or inorganic pigment, UV absorber, photo-stabilizer, disperser, copper inhibitor, neutralizer, plasticizer, nucleating agent, pigment, and the like, as necessary.

The resin material for an electrical insulating material and electrical insulating material according to the present invention may be used as a insulating material for electric wire, cable, and condenser; a insulating material and distributing cord for high electrical voltage such as an X-ray generator, and the like.

The electric wire and cable according to the present invention comprise the aforementioned resin material for an electrical insulating material and electrical insulating material, or alternatively, an insulating layer in which the same are cross-linked.

Concrete examples of the aforementioned electric wire and cable include an electric cable in which at least the conductor is covered with an insulating layer comprising the aforementioned resin material for an electrical insulating material, electrical insulating material, or cross-linked product of the same. It is possible to change the conductor parts into aggregated wires, install a semiconducting layer between the conductor and insulating layer, or alternatively, form a flame retardant resin layer on the outer side of the insulating layer, if necessary.

Concrete examples of the aforementioned electric wire and cable may include a cable comprising a wire which is formed from an aggregate of copper wires, a semiconducting layer which is covering the wire and formed by a resin composition to which a conductive carbon or metal powder has been added, an insulating layer which is covering the semiconducting layer and formed by the resin material for an electrical insulating material according to the present invention, a covering or semiconducting layer which is covering the insulating layer and formed by a metal sheet, and a flame retardant resin or rodent resistance resin which is provided on the outermost side; and a cable comprising an aggregate of several or numbers of covered-copper wires and a flame retardant resin or rodent resistance resin which is provided on the outermost side of said aggregate, wherein said covered-copper wire comprise a single copper wire, a semiconductor layer which is covering the wire and formed by a resin composition to which a carbon or metal powder is added, an insulating layer which is covering the semiconducting layer and formed by the resin material for an electrical insulating material according to the present invention, and a metal film layer which is further provided onto said insulating layer; and the like. The resin material for an electrical insulating material according to the present invention provides remarkable effects against high tension electrical power, and is preferably used as a large-capacity cable, and/or a direct current cable.

The present invention relates to the resin material for an electrical insulating material containing a monomer unit containing ethylenic linkages and/or a specific functional group in the resin component comprising a specific ethylene copolymer (A).

By means of containing the aforementioned specific ethylene copolymer (A), it is possible to improve the processability, thermal resistance, and mechanical strength, and also reduce the temperature dependency of the volume resistivity of the resin material for an electrical insulating material.

Furthermore, the aforementioned functional group functions as a trap site to prevent charge-transfer. In addition, this functional group regulates the entrance of charge from the exterior. As a result, it is possible to improve the volume resistivity and space charge characteristics of the resin material for an electrical insulating material.

In addition, the aforementioned aromatic ring group provides the effects of absorbing high-energy electrons, diffusing the electron energy as the heat, and emitting low-energy electrons, (i.e., electron energy absorption effects). In this manner, it is possible to lower the electron energy, which triggers dielectric breakdown, and thus improve the dielectric breakdown strength of the resin material for an electrical insulating material.

The ethylenic linkages function as cross-linking points, and thus improve the cross-linking efficiency. In addition, at the time of cross-linking, the residues from the breakdown of the cross-linking agent are taken into the main chain. The residues floating in the bulk are dissolved via ions produced by means of heat and electrical fields to become charged, which leads to a reduction of the volume resistivity. Therefore, by means of taking in the residues into the main chain, it is possible to prevent such effects, and increase the volume resistivity of the resin material for an electrical insulating material.

By means of taking advantages of these aforementioned effects, it is possible to not only improve the volume resistivity and breakdown strength, and prevent deterioration of the electric properties after crosslinking, but also to dramatically increase the volume resistivity and dielectric strength, when compared with that prior to crosslinking.

EXAMPLES

In the following, the present invention is further described in detail, using the examples. However, the present invention is not limited to these examples.

The testing method in the present example is described in the following.
(Properties of the Ethylene Copolymer)
[Density]
The measurement of the density was performed according to JIS K6760.
[MFR]
The measurement of the MFR was performed according to JIS K6760.
[Measurement of $T_{m1}$ using DSC]
A sheet with a thickness of 0.2 mm was formed by means of hot pressing the sample. A test sample of approximately 5 mg was stamped from this sheet, maintained for 10 minutes at 230° C., and then cooled to 0° C. at a cooling rate of 2° C./minute. This material was subsequently re-heated to 170° C. at a heating rate of 10° C./minute, and the temperature at the peak of the resulting highest temperature curve was recorded as the highest peak temperature, $T_{m1}$.
[Mw/Mn]
Mw/Mn was measured using GPC (Type-150C, manufactured by Waters Corporation). ODCB was used at 135° C. as a solvent, and $GMH_{HR}$-H(S) (manufactured by Toso Corporation) was used as the column.
[TREF]
The sample was injected into the column, maintained at 140° C., and cooled to 25° C. at a cooling rate of 4° C./hour. After the polymer was deposited onto glass beads, the column was heated under the following conditions, to detect the polymer concentration eluted at each temperature level, using an infrared detector. Solvent: ODCB; flow speed: 1 ml/minute; heating rate: 5° C./minute; detector: infrared spectrometer (with a wave number of 2925 $cm^{-1}$); column: 0.8 cm$\phi$×12 cmL (filled with glass beads); and the concentration of the sample: 1 mg/ml.
[Melt tension]
Melt tension was determined by means of measuring stress when the melted polymer was drawn at a constant speed, using a strain gauge. Granulated pellet was used as a test material, and MT Measuring Device (manufactured by Toyo Seiki Seisaku-Sho, Ltd.) was used as a measuring device. The orifice possessed a hole diameter of 2.09 mm$\phi$, and a length of 8 mm was used. Measuring conditions were as follows: resin temperature: 190° C.; extrusion speed: 20 mm/minute; and winding speed 15 m/minute.
[Chlorine Concentration]
The concentration of the chlorine was measured according to the fluorescence X-ray method, and when the chlorine concentration rose to 10 ppm or greater, the detected value was determined as an analysis value. When the chlorine concentration was less than 10 ppm, the concentration was measured using TOX-100-type Chlorine/Sulfur Analysis Device (manufactured by Dia Instruments Co., Ltd.). The concentration of 2 ppm or less was recorded as ND, and considered as containing essentially no chlorine.

(Electrical Insulating Properties)

[Manufacturing Test Samples for Measuring the Volume Resistivity]

<Non-cross-linked Test Samples>

First, the ethylene copolymer described in the following, or resin material was formed into a sheet with a thickness of 0.3 mm, by means of hot press processing. The blended materials were in advance kneaded at 160° C. for 5 minutes using a plastomill prior to being molded into a sheet. Subsequently, the aforementioned sheet was placed between aluminum sheets, and the test sample was formed under the following conditions.

1) The sample was preheated at 140° C. for 5 minutes;
2) The sample was pressurized at 140° C., at 100 kg/cm², for 5 minutes; and
3) The sample was then cooled from 140° C. to 30° C. for 5 minutes under pressure.

<Cross-linked Test Materials>

I. The case in which dicumyl peroxide (hereinafter, referred to as DCP) was used as the cross-linking agent:

The resin material containing 2 parts by weight of DCP to 100 parts by weight of the resin material was kneaded in advance at 120° C., and formed into a sheet with a thickness of 0.3 mm by means of hot press processing. Subsequently, the aforementioned sheet was placed between Teflon sheets, and the test sample was formed under the following conditions.

1) The sample was preheated at 120° C. for 5 minutes;
2) The sample was pressurized at 120° C., at 100 kg/cm², for 5 minutes;
3) The sample was then cooled from 120° C. to 30° C. for 5 minutes. The sample containing void at this point were removed;
4) The sample was re-heated at 120° C. for 5 minutes;
5) The sample was pressurized at 120° C., at 100 kg/cm², for 5 minutes;
6) The sample was heated from 120° C. to 160° C. under the pressure;
7) The sample was heated at 160° C. for 30 minutes for cross-linking; and
8) The sample was cooled from 160° C. to 30° C. for 5 minutes under pressure.

II. The case in which 2,5-di-methyl-2,5-di(t-butylperoxy) hexine (hereinafter, referred to as PH) was used as the cross-linking agent The resin material containing 1 part by weight of PH to 100 parts by weight of the resin material was kneaded in advance at 140° C., and formed into a sheet with a thickness of 0.3 mm by means of hot-press processing. Subsequently, the aforementioned sheet was placed between Teflon sheets, and the test sample was formed under the following conditions.

1) The sample was preheated at 140° C. for 5 minutes;
2) The sample was pressurized at 140° C., at 100 kg/cm², for 5 minutes;
3) The sample was cooled from 140° C. to 30° C. for 5 minutes. The sample containing void at this point were removed;
4) The sample was re-heated at 140° C. for 5 minutes;
5) The sample was pressurized at 140° C., at 100 kg/cm², for 5 minutes;
6) The sample was heated from 140° C. to 180° C. under pressure;
7) The sample was heated at 180° C. for 30 minutes for cross-linking; and
8) The sample was cooled from 180° C. to 30° C. for 5 minutes under pressure.

[Measuring the Volume Resistivity]

Figure 2A:
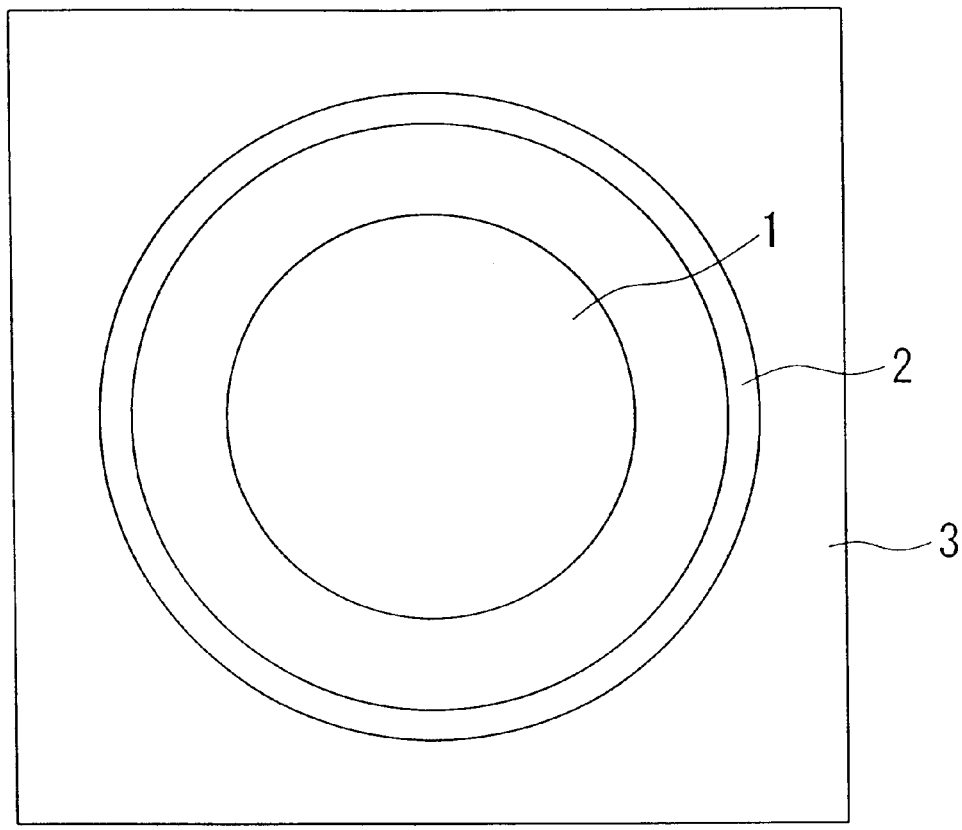
FIG. 2A shows a top view.
Figure 2B:
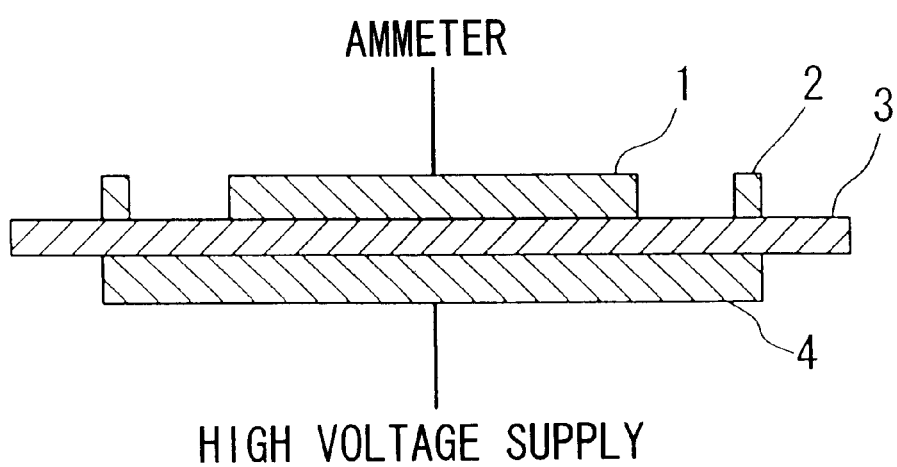
FIG. 2B shows a side cross-section view.

The electrode system for measuring the volume resistivity shown in FIG. 2 was employed. This electrode system for measuring the volume resistivity comprised a disc-shaped main electrode 1 and ring-shaped guard electrode 2, which is encompassing the main electrode 1 in the shape of concentric-circle, provided on the surface of the test sample 3, and a disc-shaped high voltage electrode 4 provided on the back side of the test sample 3. The electrode material was made of a stainless steel plate, the surface of the electrode material which lay in contact with the test sample 3 was polished by means of a buff to a mirror-like state.

The measurements were performed at room temperature (i.e., 20° C.) and at 90° C. under nitrogen atmosphere. In addition, the measurements were performed after the test sample was set into the electrode system, and short-circuited between the main electrode 1 and high voltage electrode 4 for 5 minutes to remove the charge on the surface of the test sample 3. The test material measured at 90° C. was short-circuited for 7 minutes such that the interior of the test sample was uniformly 90° C.

The applied voltage was set at 3300V of direct current provided by battery. The vibrating reed ammeter, (TR8411 manufactured by Advantest Corporation), was used as the measuring device. Pipe cable was used for connecting the measuring device and electrodes, and noise from outside was removed. This measuring system was able to measure reliably up to $3 \times 10^{17} \Omega$ at room temperature, and $3 \times 10^{16} \Omega$ at 90° C. The thickness of the test samples 3 was approximately 0.3 mm, and the thickness of each test sample was measured up to 2 digits below decimal point. The polar electrode area was 19.6 cm². From investigation of the current-time characteristics, a time of 10 minutes after voltage applying was determined as the time when the decrease in current due to absorbing currents dissipated, such that a reliable measurement of a current was able to be performed. Accordingly, the current value at 10 minutes after voltage applying was recorded; however when the current did not stabilize after 10 minutes, measurements were performed after another 5 minutes. Any current which did not stabilize thereafter was removed from the test. Based on the current values measured, the volume resistivity was obtained. Measurements were performed ten times, and the average value thereof was used as data.

[Electrical Activation Energy]

Based on the current values measured for the volume resistivity, electrical activation energy (U) was calculated according to the following Arrhenius' equation.

$$I \; \exp(-U/kT)$$

(wherein, I represents current; k represents Boltzmann's constant; and T represents absolute temperature.)

[Measuring Breakdown Voltage]

Figure 3:
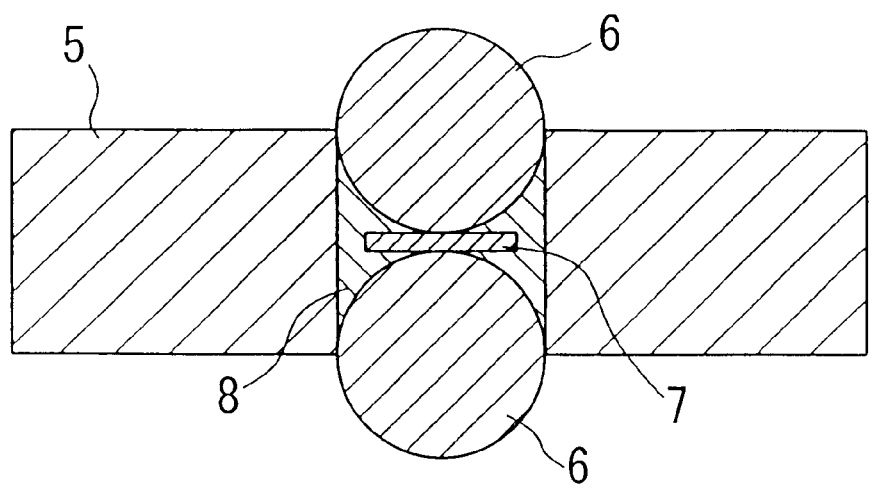
FIG. 3 is a cross-sectional diagram showing a measuring apparatus for the breakdown voltage test.

The fixed electrode shown in FIG. 3, a so-called McKeown electrode, was employed for measuring the breakdown strength. Ball-shaped electrodes 6 and 6, each comprising a stainless steel ball with a diameter of ½ inch, were arranged in a hole with a diameter of ½ inch provided in the center portion of a substrate 5 made of polymethyl methacrylate. The test material 7 cut into a square of approximately 8~10 mm with a thickness of 50 Em, was placed between these ball-shaped electrodes 6 and 6. Subsequently, a deaerated epoxy resin 8 was filled and hardened around the test material 7 and electrodes 6 and 6. McKeown electrodes formed in this manner were soaked in a container filled with silicone oil, and the container was placed in a thermostatic tank to perform measurements at 90° C. The voltage waveform used for breakdown had a negative polarity and an impulse-waveform of 1.2/50 μs, and was observed using an oscilloscope. The voltage waveforms broken down at the wave front were selected as data to obtain an average value of 20 or greater.

[Measuring Water-treeing]

Figure 4:
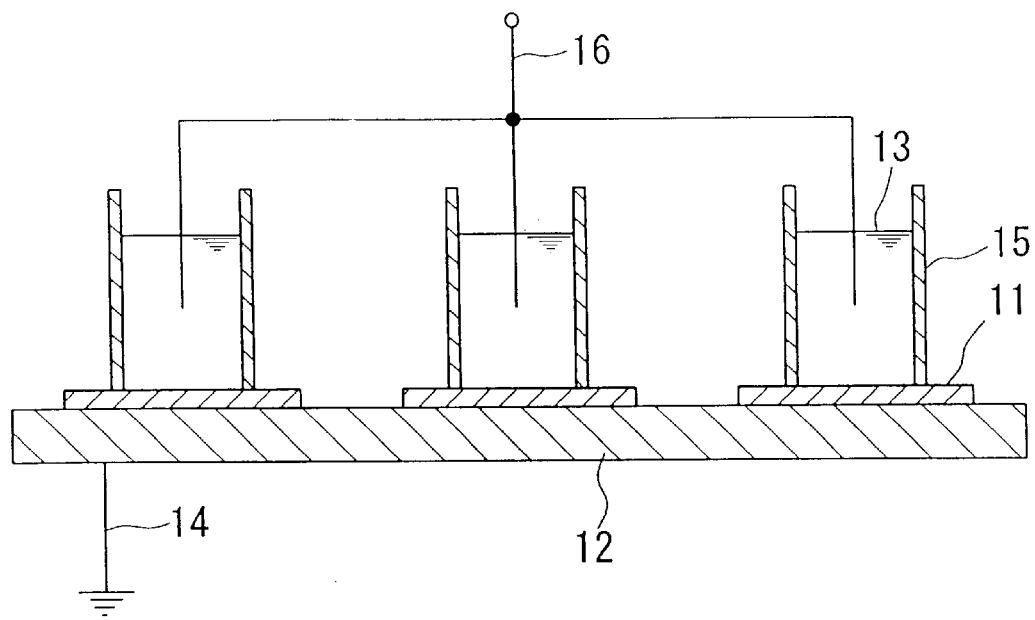
FIG. 4 is a diagram showing a side cross-sectional view of an apparatus for measuring the water-treeing.

Measuring of the water-treeing was performed by means of the equipment shown in FIG. 4. The voltage of 10 kV and 10 kHz was applied to the test sample at room temperature for 30 days. After applying, the test sample was dyed, and the generation and development of water-treeing were observed using a microscope. The water-treeing resistance was determined, using the following criteria: X when the generation and development of water-treeing was extreme; Δ when water-treeing was not extreme, but observed; and ○ when no water-treeing was observed. The measuring device for water-treeing shown in FIG. 4 comprised a conductor board 12 installed below the test sample 11 for measuring water-treeing; a container 15 filled with water 13 and installed above the test sample 11 for measuring water-treeing; a ground electrode 14 connected to the conductor board 12; and a applying electrode 16 in contact with the water 13 in the container 15. The bottom part of the container 15 comprised the test material 11.

[Measuring Space Charge]

The space charge characteristics were evaluated according to the pulse electroacoustic charge accumulation method. After applying a direct current of 15 kV on a sheet with a electrode diameter of 30 mmφ and a thickness of 0.3 mm for 60 minutes, the space charge characteristics were measured in a short-circuited status. Based on the accumulation of charge in the vicinity of the electrode, where distortion such as electric field stress and relaxation are generated, the space charge characteristics was evaluated. The accumulation of charge was evaluated, using following criteria: ○ when little accumulation was observed; "like-polarity" when a charge with the same polarity as the electrode was accumulated; and "reverse polarity" when a charge with a different polarity from the electrode was accumulated, and the evaluation of space charge characteristics was shown based on the total amount of charge.

(The Ethylene Copolymer (A))

[Preparation of Solid Catalyst]

1000 ml of toluene purified under nitrogen, 22 g of tetraethoxy zirconium ($Zr(OEt)_4$), and 74 g of indene were added to a catalyst preparation device provided with an electromagnetic induction stirrer, and 100 g of tripropyl aluminum was added therein in a dropwise manner for 10 minutes while maintaining the temperature at 90° C. The reaction was subsequently allowed to proceed for 2 hours at the same temperature. After the reactant was cooled to 40° C., 3200 ml of a toluene solution of methyl aluminoxane (with a concentration of 2.5 mmol/ml) was added and stirred for 2 hours. Subsequently, after 2000 g of silica, which was baked in advance at 450° C. for 5 hours (#952, with a surface area of 300 $m^2/g$, manufactured by W. R. Grace & Co.), was added and stirred at room temperature for 1 hour, blown with nitrogen and then dried under reduced pressure at 40° C., to yield a solid catalyst comprising a desirable fluidity.

[Gas Phase Polymerization]

Copolymerization of ethylene and 1-hexene was performed at a polymerization temperature of 80° C., and total pressure of 20 kgf/$cm^2$G, using a continuous-type, fluidized bed gas phase polymerization device. The aforementioned solid catalyst was continuously supplied for polymerization such that the ratio of ethylene, 1-hexene, and hydrogen was kept at a predetermined mol ratio, to yield three-types of the ethylene copolymers (A1)–(A3) shown in Table 1.

TABLE 1

| | Ethylene copolymer | | | | |
|---|---|---|---|---|---|
| | A1 | A2 | A3 | A'4 | A'5 |
| Density d (g/$cm^3$) | 0.930 | 0.925 | 0.936 | 0.911 | 0.935 |
| MFR (g/10 min) | 3.5 | 2.1 | 4.2 | 1.9 | 2.1 |
| Mw/Mn | 2.6 | 2.6 | 2.7 | 2.6 | 2.2 |
| TREF peak number | 1 | 1 | 1 | 1 | 1 |
| $T_{75} - T_{25}$ (° C.) | 12.4 | 13.2 | 8.0 | 6.4 | 3.0 |
| (−300 × d + 285) | 6.0 | 7.5 | 4.2 | 11.7 | 4.5 |
| (−670 × d + 644) | 20.9 | 24.3 | 16.9 | 33.6 | 17.6 |
| $T_{ml}$ (° C.) | 124 | 124 | 126 | 103 | 121 |
| (150 × d − 17) | 122.5 | 121.8 | 123.4 | 119.7 | 123.3 |
| Melt tension (g) | 0.6 | 0.8 | 0.4 | 0.7 | 2.1 |
| (log MT) | −0.22 | −0.10 | −0.40 | −0.15 | 0.32 |
| (−0.572 × log MFR + 0.3) | −0.01 | 0.12 | −0.06 | 0.39 | 0.12 |
| Chloride concentration (ppm) | ND | ND | ND | ND | 15 |
| Volume resistivity (Ωcm) at room temperature | $3.5 \times 10^{18}$ | $2.6 \times 10^{18}$ | $4.0 \times 10^{18}$ | $1.0 \times 10^{18}$ | $4.0 \times 10^{17}$ |
| Volume resistivity (Ωcm) at 90° C. | $5.6 \times 10^{17}$ | $4.1 \times 10^{17}$ | $6.0 \times 10^{17}$ | $1.0 \times 10^{17}$ | $5.0 \times 10^{14}$ |
| Electrical activation energy (eV) | 0.24 | 0.24 | 0.25 | 0.30 | 0.87 |

(Other Polyolefin (A')) (A'1) a high pressure radical process low density polyethylene (LDPE) having a density of 0.919 g/$cm^3$; an MFR of 1.0 g/10 minutes; and a product name of J-Rex LD W2000, manufactured by Japan Polyolefins Co., Ltd.

(A'2) a linear low density polyethylene (LLDPE) having a density of 0.921 g/cm; an MFR of 1.0 g/10 minutes; and a product name of J-Rex LL AF3280, manufactured by Japan Polyolefins Co., Ltd.

(A'3) a polypropylene (PP) having a density of 0.905 g/cm$^3$; an MFR of 1.5 g/10 minutes; and a product name of J-allomer F120K, manufactured by Japan Polyolefins Co., Ltd.

(A'4) a linear low density polyethylene obtained by a single site-type catalyst, obtained by means of copolymerizing ethylene and 1-butene, using a catalyst comprising bisindenyl zirconium methyl and methyl aluminoxane, according to a gas phase process (See Table 1).

(A'5) a linear low density polyethylene obtained by a metallocene catalyst with a product name of Affinity HF1030, manufactured by Dow Chemical Ltd. (See Table 1).

(Component (C))

(C1-1) a maleic anhydride-modified ethylene copolymer. 0.7 parts by weight of maleic anhydride per 100 parts by weight of the sample (A1) and 0.05 parts by weight of 2,5-dimethyl-2,5-di(t-butylperoxy) hexine were mixed together in advance using a Henschel mixer, and allowed to react at 230° C. using a twin-screw extruder. Upon analyzing the result via infrared spectroscopy, the content of the maleic anhydride per one gram of the polymer was $2.6 \times 10^{-5}$ mol.

(C1-2) a maleic anhydride-modified ethylene copolymer

A maleic anhydride was reacted with the sample (A2) in the same manner as in the aforementioned method. Upon analyzing the result via infrared spectroscopy, the content of the maleic anhydride per one gram of the polymer was $2.6 \times 10^{-5}$ mol.

(C1-3) an acrylic acid-modified ethylene copolymer

An acrylic acid and dicumyl peroxide were mixed into the sample (A1), and the reaction was allowed to proceed at 200° C., using an extruder. Upon analyzing the result via infrared spectroscopy, the content of the acrylic acid per one gram of the polymer was $3.7 \times 10^{-6}$ mol.

(C2-1) a maleic anhydride-modified high pressure radical process low density polyethylene 0.7 parts by weight of maleic anhydride to 100 parts by weight of the sample (A'1), and 0.05 parts by weight of 2,5-dimethyl-2,5-di(t-butylperoxy) hexine were mixed together in advance using a Henschel mixer, and allowed to react at 230° C. using a twin-screw extruder. Upon analyzing the result via infrared spectroscopy, the content of the maleic anhydride per one gram of the polymer was $2.6 \times 10^{-5}$ mol.

(C2-2) an acrylic acid-modified high pressure radical process low density polyethylene An acrylic acid and dicumyl peroxide were mixed into the sample (A'1), and reacted at 200° C., using an extruder. Upon analyzing the result via infrared spectroscopy, the content of the acrylic acid per one gram of the polymer was $3.4 \times 10^{-6}$ mol.

(C3-1) an ethylene-maleic anhydride random copolymer 380 g of n-hexane, 11 g of a maleic anhydride acetone solution (0.11 g of maleic anhydride), and 2,5-dimethyl-2, 5-di(t-butylperoxy) hexine, as a polymerization initiator, were added to an autoclave with a stirrer, substituted with nitrogen comprising a capacity of 3.8 L. Subsequently, after 1700 g of ethylene was added thereto, the polymerization was performed at 190° C. at 1600 kgf/cm$^2$ for 1 hour, to yield an ethylene-maleic anhydride copolymer. Upon analyzing the result via infrared spectroscopy, the content of the maleic anhydride per one gram of the polymer was $1.6 \times 10^{-3}$ mol.

(C3-2) an ethylene-vinyl alcohol copolymer (Et-VA1)

An ethylene-vinyl alcohol copolymer was obtained in the same manner as in the aforementioned method. Upon analyzing the result via infrared spectroscopy, the content of the hydroxyl group per one gram of the polymer was $2.4 \times 10^{-4}$ mol.

(C3-3) an ethylene-nitrostyrene copolymer (Et-NSt)

An ethylene-nitrostyrene copolymer was obtained in the same manner as in the aforementioned method. Upon analyzing the result via infrared spectroscopy, the content of the nitro group per one gram of the polymer was $2.4 \times 10^{-4}$ mol.

(C3-4) an ethylene-acrylonitrile copolymer (Et-AN).

An ethylene-acrylonitrile copolymer was obtained in the same manner as in the aforementioned method. Upon analyzing the result via infrared spectroscopy, the content of the nitrile group per one gram of the polymer was $2.3 \times 10^{-4}$ mol.

(Component (D))

(D1-1) an ethylene-styrene random copolymer (Et-St)

An ethylene-styrene random copolymer was obtained by the high pressure radical process. Upon analyzing the result via infrared spectroscopy, the content of the styrene per one gram of the polymer was $1.6 \times 10^{-3}$ mol.

(D1-2) a polystyrene.

(D2-1) an ethylene-styrene-maleic anhydride random copolymer

A styrene monomer and maleic anhydride were added to an autoclave equipped with a stirrer, followed by the addition of ethylene to commence the polymerization. Upon analyzing the result via infrared spectroscopy, the content of the styrene per one gram of the polymer was $1.2 \times 10^{-3}$ mol, and that of the maleic anhydride was $1.1 \times 10^{-3}$ mol.

(D3-1) a maleic anhydride-modified ethylene-styrene copolymer

A maleic anhydride was reacted with an ethylene-styrene copolymer obtained by the high pressure radical polymerization, using a dicumyl peroxide. Upon analyzing the result via infrared spectroscopy, the content of the styrene per one gram of the polymer was $1.5 \times 10$ mol, and that of the maleic anhydride was $2.0 \times 10^{-5}$ mol.

(D4-1) a styrene-modified ethylene-maleic anhydride random copolymer

A maleic anhydride was reacted with an ethylene-styrene copolymer obtained by the high pressure radical polymerization, using a dicumyl peroxide. Upon analyzing the result via infrared spectroscopy, the content of the styrene per one gram of the polymer was $1.5 \times 10^{-3}$ mol, and that of the maleic anhydride was $2.0 \times 10^{-5}$ mol.

(D5-1) a styrene-modified ethylene copolymer

A styrene was reacted with the sample (A1), using a dicumyl peroxide. Upon analyzing the result via infrared spectroscopy, the content of the styrene per one gram of the polymer was $1.2 \times 10$-3 mol.

(D6-1) a styrene- and maleic anhydride-modified ethylene copolymer

Styrene and maleic anhydride were reacted with the sample (A1), using a dicumyl peroxide. Upon analyzing the result via infrared spectroscopy, the content of the styrene per one gram of the polymer was $6.9 \times 10^{-4}$ mol, and that of the maleic anhydride was $1.9 \times 10^{-5}$ mol.

(Component (E))

(E1-1) an liquid polybutadiene possessing an average molecular weight of 3000; a specific gravity of 0.89 g/cm$^3$; and a product name of Nisseki Polybutadiene B-3000, manufactured by Nippon Petrochemicals Co., Ltd.

(E1-2) a butadiene resin possessing a specific gravity of 0.89 g/cm$^3$; and a product name of JSR RB820, manufactured by Japan Synthetic Rubber Co., Ltd.

(E1-3) an liquid polyisoprene possessing an average molecular weight of 29000; a viscosity of 740 poise/38° C.; and a product name of Kuraprene LIR-30, manufactured by Kuraray Co., Ltd.

(E2-1) a maleic anhydride-modified liquid polybutadiene possessing an average molecular weight of 3000; and a specific gravity of 0.89 g/cm$^3$; and a product name of Nisseki Polybutadiene M-2000, manufactured by Nippon Petrochemicals Co., ltd. Upon analyzing the result via infrared spectroscopy, the content of the maleic anhydride per one gram of the polymer was $7.0\times10^{-2}$ mol.

(E2-2) an acrylic acid-modified liquid polybutadiene possessing an average molecular weight of 2000; a specific gravity of 0.91 g/cm$^3$; and a product name of Nisseki Polybutadiene MAC-2000, manufactured by Nippon Petrochemicals Co., Ltd. Upon analyzing the result via infrared spectroscopy, the content of the acrylic acid per one gram of the polymer was $2.2\times10^{-4}$ mol.

(E2-3) a maleic anhydride-modified butadiene resin

A butadiene resin was modified using maleic anhydride, while heating by means of a single-screw extruder. Upon analyzing the result via infrared spectroscopy, the content of the maleic anhydride per one gram of the polymer was $3.4\times10^{-4}$ mol.

(E2-4) a maleic anhydride-modified liquid polyisoprene

An liquid polyisoprene was modified using maleic anhydride, while heating by means of using an autoclave. Upon analyzing the result via infrared spectroscopy, the content of the maleic anhydride per one gram of the polymer was $2.9\times10^{-4}$ mol.

(E3-1) a maleic anhydride-modified butadiene copolymer

A butadiene copolymer was modified using maleic anhydride, while heating by means of using an autoclave. Upon analyzing the result via infrared spectroscopy, the content of the maleic anhydride per one gram of the polymer was $9.0\times10^{-5}$ mol.

(E4-1) a mixture of an ethylene-vinyl alcohol copolymer (with an alcohol residue per one gram of the copolymer was $1.1\times10^{-3}$ mol), obtained by means of hydrolysis following copolymerization of ethylene and vinyl alcohol, and a butadiene resin (E1-2).

(E5-1) divinyl benzene.

Examples 1 to 79

The components selected from among the components (A), (C), (D) and (E) were used according to the mixing ratios shown in Tables 2 to 8, and cross-linked, as necessary.

TABLE 2-1

| | | Resin composition | | | | | | |
|---|---|---|---|---|---|---|---|---|
| | | Component (A) | | Component (E) | | Component (C) | | Component (D) |
| | Example | Type | Parts by weight | Type | Parts by weight | Type | Parts by weight | Type | Parts by weight |
| <1> | 1 | | | | | C1-1 | 100.0 | | |
| <1> | 2 | | | | | C1-2 | 100.0 | | |
| <1> | 3 | | | | | C1-3 | 100.0 | | |
| <2> | 4 | A1 | 92.0 | | | C1-1 | 8.0 | | |
| <2> | 5 | A1 | 81.0 | | | C1-1 | 19.0 | | |
| <2> | 6 | A1 | 62.0 | | | C1-1 | 38.0 | | |
| <2> | 7 | A1 | 81.0 | | | C1-2 | 19.0 | | |
| <2> | 8 | A1 | 70.0 | | | C1-3 | 30.0 | | |
| <2> | 9 | A1 | 81.0 | | | C1-2 | 19.0 | | |
| <2> | 10 | A1 | 92.0 | | | C2-1 | 8.0 | | |
| <2> | 11 | A1 | 81.0 | | | C2-1 | 19.0 | | |
| <2> | 12 | A1 | 62.0 | | | C2-1 | 38.0 | | |

TABLE 2-2

| | | Resin composition | | | | Measurement condition | |
|---|---|---|---|---|---|---|---|
| | | Aromatic component | Functional group component | | Number of ethylenic linkages (per | | Cross-linking |
| | Example | (mol/g) | Type | (mol/g) | 1000 C) | Cross-linking | agent |
| <1> | 1 | | M1 | $2.6\times10^{-5}$ | | None | |
| <1> | 2 | | M1 | $2.6\times10^{-5}$ | | None | |
| <1> | 3 | | M1 | $3.7\times10^{-6}$ | | None | |
| <2> | 4 | | M1 | $2.0\times10^{-6}$ | | None | |
| <2> | 5 | | M1 | $4.9\times10^{-6}$ | | None | |
| <2> | 6 | | M1 | $9.8\times10^{-6}$ | | None | |
| <2> | 7 | | M1 | $4.9\times10^{-6}$ | | None | |
| <2> | 8 | | M1 | $1.1\times10^{-6}$ | | None | |
| <2> | 9 | | M1 | $4.9\times10^{-6}$ | | None | |
| <2> | 10 | | M1 | $2.0\times10^{-6}$ | | None | |
| <2> | 11 | | M1 | $4.9\times10^{-6}$ | | None | |
| <2> | 12 | | M1 | $9.8\times10^{-6}$ | | None | |

TABLE 3-1

| | | Resin composition | | | | | | |
|---|---|---|---|---|---|---|---|---|
| | | Component (A) | | Component (E) | | Component (C) | | Component (D) | |
| | Example | Type | Parts by weight | Type | Parts by weight | Type | Parts by weight | Type | Parts by weight |
| <2> | 13 | A2 | 81.0 | | | C2-1 | 19.0 | | |
| <2> | 14 | A1 | 70.0 | | | C2-2 | 30.0 | | |
| <2> | 15 | A3 | 81.0 | | | C2-1 | 19.0 | | |
| <2>' | 16 | A1 | 99.6 | | | C3-1 | 0.4 | | |
| <2>' | 17 | A1 | 99.0 | | | C3-2 | 1.0 | | |
| <2>' | 18 | A1 | 99.0 | | | C3-3 | 1.0 | | |
| <2>' | 19 | A2 | 99.0 | | | C3-4 | 1.0 | | |
| <2>' | 20 | A1 | 99.0 | | | C3-4 | 1.0 | | |
| <3> | 21 | A'1 | 81.0 | | | C1-1 | 19.0 | | |
| <3> | 22 | A'1 | 70.0 | | | C1-3 | 30.0 | | |
| <3> | 23 | A'2 | 81.0 | | | C1-1 | 19.0 | | |

TABLE 3-2

| | | Resin composition | | | | | Measurement condition | |
| | | Aromatic component | Functional group component | | Number of ethylenic linkages (per | Cross- | Cross-linking |
| | Example | (mol/g) | Type | (mol/g) | 1000 C) | linking | agent |
|---|---|---|---|---|---|---|---|
| <2> | 13 | | M1 | $4.9 \times 10^{-6}$ | | None | |
| <2> | 14 | | M1 | $1.0 \times 10^{-6}$ | | None | |
| <2> | 15 | | M1 | $4.9 \times 10^{-6}$ | | None | |
| <2>' | 16 | | M1 | $6.1 \times 10^{-6}$ | | None | |
| <2>' | 17 | | M2 | $2.1 \times 10^{-6}$ | | None | |
| <2>' | 18 | | M3 | $2.1 \times 10^{-6}$ | | None | |
| <2>' | 19 | | M4 | $2.1 \times 10^{-6}$ | | None | |
| <2>' | 20 | | M4 | $2.1 \times 10^{-6}$ | | None | |
| <3> | 21 | | M1 | $4.9 \times 10^{-6}$ | | None | |
| <3> | 22 | | M1 | $1.0 \times 10^{-6}$ | | None | |
| <3> | 23 | | M1 | $4.9 \times 10^{-6}$ | | None | |

TABLE 4-1

| | | Resin composition | | | | | | | |
|---|---|---|---|---|---|---|---|---|---|
| | | Component (A) | | Component (E) | | Component (C) | | Component (D) | |
| | Example | Type | Parts by weight | Type | Parts by weight | Type | Parts by weight | Type | Parts by weight |
| <3> | 24 | A'3 | 81.0 | | | C1-1 | 19.0 | | |
| <3> | 25 | A'4 | 81.0 | | | C1-1 | 19.0 | | |
| <4> | 26 | A1 | 8.0 | | | C1-1 | 19.0 | | |
| | | A'4 | 73.0 | | | | | | |
| <4> | 27 | A1 | 8.0 | | | C2-1 | 19.0 | | |
| | | A'1 | 73.0 | | | | | | |
| <4> | 28 | A2 | 8.0 | | | C2-1 | 19.0 | | |
| | | A'1 | 73.0 | | | | | | |
| <4> | 29 | A1 | 7.0 | | | C2-2 | 30.0 | | |
| | | A'1 | 63.0 | | | | | | |
| <4>' | 30 | A1 | 10.0 | | | C3-1 | 0.4 | | |
| | | A'1 | 89.6 | | | | | | |
| <4>' | 31 | A1 | 9.0 | | | C3-2 | 1.0 | | |
| | | A'1 | 90.0 | | | | | | |
| <4>' | 32 | A1 | 9.0 | | | C3-3 | 1.0 | | |
| | | A'1 | 90.0 | | | | | | |
| <4>' | 33 | A1 | 9.0 | | | C3-4 | 1.0 | | |
| | | A'1 | 90.0 | | | | | | |

TABLE 4-2

| | | Resin composition | | | Measurement condition | |
| | | Aromatic component | Functional group component | | Number of ethylenic linkages (per | Cross- | Cross-linking |
| Example | | (mol/g) | Type | (mol/g) | 1000 C) | linking | agent |
|---|---|---|---|---|---|---|---|
| <3> | 24 | | M1 | $4.9 \times 10^{-6}$ | | | None |
| <3> | 25 | | M1 | $4.9 \times 10^{-6}$ | | | None |
| <4> | 26 | | M1 | $4.9 \times 10^{-6}$ | | | None |
| <4> | 27 | | M1 | $4.9 \times 10^{-6}$ | | | None |
| <4> | 28 | | M1 | $4.9 \times 10^{-6}$ | | | None |
| <4> | 29 | | M1 | $1.0 \times 10^{-6}$ | | | None |
| <4>' | 30 | | M1 | $6.0 \times 10^{-6}$ | | | None |
| <4>' | 31 | | M2 | $2.1 \times 10^{-6}$ | | | None |
| <4>' | 32 | | M3 | $2.1 \times 10^{-6}$ | | | None |
| <4>' | 33 | | M4 | $2.1 \times 10^{-6}$ | | | None |

TABLE 5-1

| | | Resin composition | | | | | | |
| | | Component (A) | | Component (E) | | Component (C) | | Component (D) | |
| Example | | Type | Parts by weight | Type | Parts by weight | Type | Parts by weight | Type | Parts by weight |
|---|---|---|---|---|---|---|---|---|---|
| <5> | 34 | A1 | 99.7 | E2-1 | 0.3 | | | | |
| <5> | 35 | A1 | 99.2 | E2-1 | 0.8 | | | | |
| <5> | 36 | A1 | 98.4 | E2-2 | 1.6 | | | | |
| <5> | 37 | A2 | 99.7 | E2-1 | 0.3 | | | | |
| <5> | 38 | A3 | 99.7 | E2-1 | 0.3 | | | | |
| <6> | 39 | A1 / A'1 | 10.0 / 89.7 | E2-1 | 0.3 | | | | |
| <6> | 40 | A1 / A'1 | 10.0 / 89.2 | E2-1 | 0.8 | | | | |
| <6> | 41 | A1 / A'1 | 10.0 / 88.4 | E2-2 | 1.6 | | | | |
| <6> | 42 | A1 / A'1 | 9.0 / 90.0 | E2-3 | 1.0 | | | | |
| <6> | 43 | A1 / A'1 | 10.0 / 88.8 | E2-4 | 1.2 | | | | |
| <6> | 44 | A1 / A'2 | 10.0 / 89.7 | E2-1 | 0.3 | | | | |
| <6> | 45 | A2 / A'1 | 10.0 / 89.7 | E2-1 | 0.3 | | | | |

TABLE 5-2

| | | Resin composition | | | | Measurement condition | |
| | | Aromatic component | Functional group component | | Number of ethylenic linkages (per | Cross- | Cross-linking |
| Example | | (mol/g) | Type | (mol/g) | 1000 C) | linking | agent |
|---|---|---|---|---|---|---|---|
| <5> | 34 | | M1 | $2.0 \times 10^{-6}$ | 0.8 | Present | PH |
| <5> | 35 | | M1 | $5.0 \times 10^{-6}$ | 1.8 | Present | PH |
| <5> | 36 | | M1 | $3.5 \times 10^{-6}$ | 3.0 | Present | PH |
| <5> | 37 | | M1 | $2.0 \times 10^{-6}$ | 0.8 | Present | PH |
| <5> | 38 | | M1 | $2.0 \times 10^{-6}$ | 0.8 | Present | PH |
| <6> | 39 | | M1 | $2.0 \times 10^{-6}$ | 0.8 | Present | DCP |
| <6> | 40 | | M1 | $5.0 \times 10^{-6}$ | 1.8 | Present | DCP |
| <6> | 41 | | M1 | $3.5 \times 10^{-6}$ | 3.0 | Present | DCP |
| <6> | 42 | | M1 | $3.3 \times 10^{-6}$ | 1.9 | Present | DCP |
| <6> | 43 | | M1 | $3.4 \times 10^{-6}$ | 2.1 | Present | DCP |
| <6> | 44 | | M1 | $2.0 \times 10^{-6}$ | 0.8 | Present | DCP |
| <6> | 45 | | M1 | $2.0 \times 10^{-6}$ | 0.8 | Present | DCP |

TABLE 6-1

| | | Resin composition | | | | | | |
|---|---|---|---|---|---|---|---|---|
| | | Component (A) | | Component (E) | | Component (C) | | Component (D) |
| | Example | Type | Parts by weight | Type | Parts by weight | Type | Parts by weight | Type | Parts by weight |
| <6>' | 46 | A1 | 9.6 | E3–1 | 4.0 | | | |
| | | A'1 | 86.4 | | | | | |
| <6>' | 47 | A1 | 10.0 | E4–1 | 0.4 | | | |
| | | A'1 | 89.6 | | | | | |
| <7> | 48 | | | E1–1 | 1.0 | C1-1 | 99.0 | |
| <7>' | 49 | | | E2–1 | 0.3 | C1-1 | 99.7 | |
| <7>' | 50 | | | E2–1 | 0.3 | C1-2 | 99.7 | |
| <8> | 51 | A1 | 89.7 | E2–1 | 0.3 | C2-1 | 10.0 | |
| <8> | 52 | A1 | 89.7 | E2–1 | 0.3 | C1-1 | 10.0 | |
| <8>' | 53 | A'1 | 89.7 | E2–1 | 0.3 | C1-1 | 10.0 | |
| <9> | 54 | A1 | 9.0 | E2–1 | 0.3 | C2-1 | 10.0 | |
| | | A'1 | 80.7 | | | | | |
| <9> | 55 | A1 | 8.0 | E1–1 | 1.0 | C2-1 | 19.0 | |
| | | A'1 | 72.0 | | | | | |
| <9>' | 56 | A1 | 8.0 | E1–2 | 1.0 | C2-1 | 19.0 | |
| | | A'1 | 72.0 | | | | | |

TABLE 6-2

| | | Resin composition | | | | Measurement condition | |
|---|---|---|---|---|---|---|---|
| | Example | Aromatic component (mol/g) | Functional group component Type | Functional group component (mol/g) | Number of ethylenic linkages (per 1000 C) | Cross-linking | Cross-linking agent |
| <6>' | 46 | | M1 | $3.5 \times 10^{-6}$ | 7.6 | Present | DCP |
| <6>' | 47 | | M2 | $4.4 \times 10^{-6}$ | 1.0 | Present | DCP |
| <7> | 48 | | M1 | $2.5 \times 10^{-5}$ | 2.1 | Present | PH |
| <7>' | 49 | | M1 | $2.7 \times 10^{-5}$ | 0.8 | Present | PH |
| <7>' | 50 | | M1 | $2.7 \times 10^{-5}$ | 0.8 | Present | PH |
| <8> | 51 | | M1 | $4.6 \times 10^{-6}$ | 1.8 | Present | PH |
| <8> | 52 | | M1 | $4.6 \times 10^{-6}$ | 0.8 | Present | PH |
| <8>' | 53 | | M1 | $4.6 \times 10^{-6}$ | 0.8 | Present | PH |
| <9> | 54 | | M1 | $4.6 \times 10^{-6}$ | 0.8 | Present | DCP |
| <9> | 55 | | M1 | $4.9 \times 10^{-6}$ | 2.1 | Present | DCP |
| <9>' | 56 | | M1 | $4.9 \times 10^{-6}$ | 1.9 | Present | DCP |

TABLE 7-1

| | | Resin composition | | | | | | |
|---|---|---|---|---|---|---|---|---|
| | | Component (A) | | Component (E) | | Component (C) | | Component (D) |
| | Example | Type | Parts by weight | Type | Parts by weight | Type | Parts by weight | Type | Parts by weight |
| <9>' | 57 | A1 | 8.0 | E1–3 | 1.0 | C2-1 | 19.0 | | |
| | | A'1 | 72.0 | | | | | | |
| <9>' | 58 | A3 | 8.0 | E1–1 | 1.0 | C2-1 | 19.0 | | |
| | | A'1 | 72.0 | | | | | | |
| <10> | 59 | A1 | 80.8 | E5–1 | 0.2 | C1-1 | 19.0 | | |
| <10> | 60 | A1 | 80.8 | E5–1 | 0.2 | C2-1 | 19.0 | | |
| <11> | 61 | A1 | 8.0 | E5–1 | 0.2 | C2-1 | 19.0 | | |
| | | A'1 | 72.8 | | | | | | |
| <12> | 62 | A1 | 95.0 | | | | | D1-1 | 5.0 |
| <12> | 63 | A1 | 90.0 | | | | | D1-1 | 10.0 |
| <12> | 64 | A1 | 50.0 | | | | | D1-2 | 50.0 |
| <13> | 65 | A1 | 89.7 | E2–1 | 0.3 | | | D1-1 | 10.0 |
| <14> | 66 | | | | | C1-1 | 19.0 | D1-1 | 81.0 |
| <14>' | 67 | | | | | C1-1 | 19.0 | D5-1 | 81.0 |

TABLE 7-2

| | | Resin composition | | | | Measurement condition | |
|---|---|---|---|---|---|---|---|
| | | Aromatic component | Functional group component | | Number of ethylenic linkages (per | Cross- | Cross-linking |
| Example | | (mol/g) | Type | (mol/g) | 1000 C) | linking | agent |
| <9>' | 57 | | M1 | $4.9 \times 10^{-6}$ | 2.0 | Present | DCP |
| <9>' | 58 | | M1 | $4.9 \times 10^{-6}$ | 2.1 | Present | DCP |
| <10> | 59 | $1.5 \times 10^{-5}$ | M1 | $4.9 \times 10^{-6}$ | 0.8 | Present | PH |
| <10> | 60 | $1.5 \times 10^{-5}$ | M1 | $4.9 \times 10^{-6}$ | 0.8 | Present | PH |
| <11> | 61 | $1.5 \times 10^{-5}$ | M1 | $4.9 \times 10^{-6}$ | 0.8 | Present | DCP |
| <12> | 62 | $7.8 \times 10^{-5}$ | | | | None | |
| <12> | 63 | $1.5 \times 10^{-4}$ | | | | None | |
| <12> | 64 | $4.8 \times 10^{-3}$ | | | | None | |
| <13> | 65 | $1.5 \times 10^{-4}$ | M1 | $2.1 \times 10^{-6}$ | 0.8 | Present | PH |
| <14> | 66 | $1.2 \times 10^{-3}$ | M1 | $4.9 \times 10^{-6}$ | | None | |
| <14>' | 67 | $9.7 \times 10^{-4}$ | M1 | $4.9 \times 10^{-6}$ | | None | |

TABLE 8-1

| | | Resin composition | | | | | | |
|---|---|---|---|---|---|---|---|---|
| | | Component (A) | | Component (E) | | Component (C) | | Component (D) |
| Example | | Type | Parts by weight | Type | Parts by weight | Type | Parts by weight | Type | Parts by weight |
| <15> | 68 | A1 | 90.0 | | | | | D1-1 | 5.0 |
| | | | | | | | | D3-1 | 5.0 |
| <15>' | 69 | A1 | 98.0 | | | | | D2-1 | 2.0 |
| <15>' | 70 | A1 | 95.0 | | | | | D3-1 | 5.0 |
| <15>' | 71 | A1 | 97.0 | | | | | D4-1 | 3.0 |
| <15>' | 72 | A1 | 90.0 | | | | | D5-1 | 10.0 |
| <15>' | 73 | A1 | 85.0 | | | | | D6-1 | 15.0 |
| <16> | 74 | | | | | | | D5-1 | 100.0 |
| <16> | 75 | | | | | | | D6-1 | 100.0 |
| <17> | 76 | | | E1-1 | 1.0 | | | D5-1 | 99.0 |
| <17> | 77 | | | E1-1 | 1.0 | | | D6-1 | 99.0 |
| <18> | 78 | A1 | 99.0 | E1-1 | 1.0 | | | | |
| <18> | 79 | A1 | 89.0 | E1-1 | 1.0 | | | D1-1 | 10.0 |

TABLE 8-2

| | | Resin composition | | | | Measurement condition | |
|---|---|---|---|---|---|---|---|
| | | Aromatic component | Functional group component | | Number of ethylenic linkages (per | Cross- | Cross-linking |
| Example | | (mol/g) | Type | (mol/g) | 1000 C) | linking | agent |
| <15> | 68 | $1.5 \times 10^{-4}$ | M1 | $1.0 \times 10^{-5}$ | | None | |
| <15>' | 69 | $2.3 \times 10^{-5}$ | M1 | $2.1 \times 10^{-5}$ | | None | |
| <15>' | 70 | $7.9 \times 10^{-5}$ | M1 | $1.0 \times 10^{-5}$ | | None | |
| <15>' | 71 | $4.5 \times 10^{-5}$ | M1 | $4.7 \times 10^{-5}$ | | None | |
| <15>' | 72 | $1.1 \times 10^{-4}$ | | | | None | |
| <15>' | 73 | $1.0 \times 10^{-4}$ | M1 | $2.8 \times 10^{-6}$ | | None | |
| <16> | 74 | $1.2 \times 10^{-3}$ | | | | None | |
| <16> | 75 | $6.9 \times 10^{-4}$ | M1 | $1.9 \times 10^{-5}$ | | None | |
| <17> | 76 | $1.1 \times 10^{-3}$ | | | 2.1 | Present | PH |
| <17> | 77 | $6.8 \times 10^{-4}$ | M1 | $1.8 \times 10^{-5}$ | 2.1 | Present | PH |
| <18> | 78 | | | | 2.1 | Present | PH |
| <18> | 79 | $1.5 \times 10^{-4}$ | | | 2.1 | Present | PH |

<1> Examples 1 to 3 are graft copolymers (C11) obtained by means of modifying the ethylene copolymer (A) using a functional group-containing monomer (M1), as described in Preferred Example 1, and concretely comprise a sample selected from (C1-1), (C1-2), and (C1-3), respectively.

The measured results of the electrical insulating properties are shown in Table 9. The volume resistivity, space charge characteristics, and water-treeing properties all displayed significant improvements.

<2> Examples 4 to 15 represent compositions comprising the ethylene copolymer (A); and a graft copolymer (C11) obtained by means of modifying the ethylene copolymer (A) using a functional group-containing monomer (M1), and/or a graft copolymer (C21) obtained by means of modifying another polyolefin (A') using a functional group-containing monomer (M1), as described in Preferred Example 2. Concretely, these examples comprise compositions obtained by means of combining of samples selected from (A1) to (A3), (C1-1) to (C1-3), (C2-1), and (C2-2). The measured results of the electrical insulating properties are shown in Tables 9 and 10.

<2>' In addition, Examples 16 to 20 represent compositions comprising the ethylene copolymer (A); and a random copolymer (C3) of an olefin and at least one monomer (M1) to (M4). Concretely, these examples comprise compositions obtained by means of combining of samples selected from (A1), (A2), and (C3-1) to (C3-4).

The measured results of the electrical insulating properties are shown in Table 10. The volume resistivity, space charge characteristics, and water-treeing properties all displayed significant improvements.

<3> Examples 21 to 25 represent compositions comprising another polyolefin (A'), and a graft copolymer (C11) obtained by means of modifying the ethylene copolymer (A) using a functional group-containing monomer (M1), as described in Preferred Example 3. Concretely, these examples comprise compositions obtained by means of combining samples selected from (A'1) to (A'4), (C1-1), and (C1-3).

The measured results of the electrical insulating properties are shown in Tables 10 and 11. The volume resistivity, space charge characteristics, and water-treeing all displayed significant improvements.

<4> Examples 26 to 29 represent compositions comprising the ethylene copolymer (A); another polyolefin (A'); and a graft copolymer (C11) obtained by means of modifying the ethylene copolymer (A) using a functional group-containing monomer (M1), and/or a graft copolymer (C21) obtained by means of modifying another polyolefin using a functional group-containing monomer (M1), as described in Preferred Example 4. Concretely, these examples comprise compositions obtained by means of combining samples selected from (A1), (A2), (A'1), (A'4), (C2-1), and (C2-2). The measured results of the electrical insulating properties are shown in Table 11.

<4>' In addition, Examples 30 to 33 represent compositions comprising the ethylene copolymer (A), another polyolefin (A'), and a random copolymer (C3) of the olefin and at least one monomer (M1) to (M4). Concretely, these examples comprise compositions formed by means of combining samples selected from (A1), (A'1), and (C3-1) to (C3-4).

The measured results of the electrical insulating properties are shown in Table 11. The volume resistivity, space charge characteristics, and water-treeing all displayed significant improvements.

<5> Examples 34 to 38 represent compositions comprising the ethylene copolymer (A); and a graft copolymer (E21) obtained by means of modifying a homopolymer comprising a monomer containing two or more ethylenic linkages, using a functional group-containing monomer (M1), as described in Preferred Example 5. Concretely, these examples comprise compositions obtained by means of combining samples selected from (A1) to (A3), (E2-1), and (E2-2). The measured results of the electrical insulating properties are shown in Table 12. These aforementioned examples exhibited a high volume resistivity, even after cross-linking, in addition to improved space charge characteristics and water-treeing properties.

<6> Examples 39 to 45 represent compositions comprising the ethylene copolymer. (A), another polyolefin (A'), and a graft copolymer (E21) obtained by means of modifying a homopolymer comprising a monomer containing two or more ethylenic linkages, using a functional-group containing monomer (M1), as described in Preferred Example 6. Concretely, these examples comprise compositions obtained by means of combining samples selected from (A1), (A2), (A'1), (A'2), and (E2-1) to (E2-4). The measured results of the electrical insulating properties are shown in Table 12.

<6>' In addition, Examples 46 and 47 represent compositions comprising the ethylene copolymer (A); another polyolefin (A'); and a random copolymer (E3) of a monomer containing two or more ethylenic linkages and at least one monomer of (M1) to (M5), or a random copolymer (E4) comprising a monomer containing two or more ethylenic linkages and at least one monomer of (M1) to (M5). Concretely, these examples comprise compositions obtained by means of combining samples selected from (A1), (A'1), (E3-1), and (E4-1).

The measured results of the electrical insulating properties are shown in Table 13. These examples similarly exhibited a high volume resistivity even after cross-linking, and showed improved space charge characteristics and water-treeing properties. The volume resistivity increased with increases in the proportional content of (E2-1).

<7> Example 48 represents the composition comprising a graft copolymer (C11) obtained by means of modifying the ethylene copolymer (A) using a functional group-containing monomer (M1), and a homopolymer (E11) comprising a monomer containing two or more ethylenic linkages, as described in Preferred Example 7. Concretely, this example comprises samples (E1-1) and (C1-1). The measured results of the electrical insulating properties are shown in Table 13.

<7>' In addition, Examples 49 and 50 represent the composition comprising a graft copolymer (C11) obtained by means of modifying the ethylene copolymer (A) using a functional group-containing monomer (M1); and a graft copolymer (E21) obtained by means of modifying a homopolymer comprising a monomer containing two or more ethylenic linkages, using a functional group-containing monomer (M1). Concretely, these examples comprise compositions formed by means of combining samples (E2-1), and (C1-1) or (C1-2). The measured results of the electrical insulating properties are shown in Table 13. These examples exhibited a high volume resistivity, even after cross-linking, and also displayed improved space charge characteristics and water-treeing properties.

<8> Examples 51 and 52 represent compositions comprising the ethylene copolymer (A); a graft copolymer (E21) obtained by means of modifying a homopolymer comprising a monomer containing two or more ethylenic linkages, using a functional group-containing monomer (M1); and a graft copolymer (C11) obtained by means of modifying the ethylene copolymer (A) using a functional group-containing monomer (M1), and/or a graft copolymer (C21) obtained by means of modifying another polyolefin (A') using a functional group-containing monomer (M1), as described in Preferred Example 8. Concretely, these examples comprise compositions obtained by means of combining samples selected from (A1), (E2-1), (C1-1), and (C2-1). The measured results of the electrical insulating properties are shown in Table 13.

<8>' In addition, Example 53 represents a composition comprising another polyolefin (A'); a graft copolymer (E21) obtained by means of modifying a homopolymer comprising a monomer containing two or more ethylenic linkages, using a functional group-containing monomer (M1); and a graft copolymer (C11) obtained by means of modifying the ethylene copolymer (A) using a functional group-containing monomer (M1). Concretely, these examples comprise compositions obtained by means of combining samples (A'1), (E2-1), and (C1-1).

The measured results of the electrical insulating properties are shown in Table 13. The examples exhibited a high volume resistivity even after cross-linking, and also displayed improved space charge characteristics and water-treeing properties.

<9> Examples 54 and 55 represent compositions comprising the ethylene copolymer (A); another polyolefin (A'); a graft copolymer (E21) obtained by means of modifying a homopolymer comprising a monomer containing two or more ethylenic linkages, using a functional group-containing monomer (M1); and a graft copolymer (C21) obtained by means of modifying another polyolefin (A') using a functional group-containing monomer (M1), as described in Preferred Example 9. Concretely, these examples comprise compositions obtained by means of combining samples (A1), (A'1), (E2-1), and (C2-1). The measured results of the electrical insulating properties are shown in Table 13.

<9>' In addition, Examples 56 to 58 represent compositions comprising the ethylene copolymer (A); another polyolefin (A'); a homopolymer (E11) comprising a monomer containing two or more ethylenic linkages; and a graft copolymer (C21) obtained by means of modifying another polyolefin (A') using a functional group-containing monomer (M1). Concretely, these examples comprise compositions obtained by means of combining samples selected from (A1), (A3), (A'1), (E1-1) to (E1-3), and (C2-1).

The measured results of the electrical insulating properties are shown in Tables 13 and 14. These examples exhibited a high volume resistivity, even after cross-linking, and also displayed improved space charge characteristics and water-treeing properties. <10> Examples 59 and 60 represent compositions comprising the ethylene copolymer (A); a compound (E5) containing two or more ethylenic linkages; and a graft copolymer (C11) obtained by means of modifying the ethylene copolymer (A) using a functional group-containing monomer (M1), or a graft copolymer (C21) obtained by means of modifying another polyolefin (A') using a functional group-containing monomer (M1), as described in Preferred Example 10. Concretely, these examples comprise compositions obtained by means of combining samples (A1), (ES-1), and (C1-1) or (C2-1).

The measured results of the electrical insulating properties are shown in Table 14. The examples exhibited a high volume resistivity, even after cross-linking, and also displayed improved electrical breakdown field, space charge characteristics and water-treeing properties.

<11> Example 61 represents the composition comprising the ethylene copolymer (A); another polyolefin (A'); a compound (E5) containing two or more ethylenic linkages; and a graft copolymer (C21) obtained by means of modifying another polyolefin (A') using a functional group-containing monomer (M1), as described in Preferred Example 11. Concretely, this example comprises a combination of samples (A1), (A'1), (E5-1), and (C2-1).

The measured results of the electrical insulating properties are shown in Table 14. The examples exhibited a high volume resistivity even after cross-linking, and also displayed improved electrical breakdown field, space charge characteristics and water-treeing properties.

<12> Examples 62 to 64 represent compositions comprising the ethylene copolymer (A), and an aromatic ring-containing polymer (D1), as described in Preferred Example 12. Concretely, these examples comprise compositions obtained by means of combining samples (A1), and (D1-1) or (D2-1).

The measured results of the electrical insulating properties are shown in Table 14. The examples exhibited an improved volume resistivity, electrical breakdown field, space charge characteristics and water-treeing properties.

<13> Example 65 represents a composition comprising the ethylene copolymer (A); a graft copolymer (E21) obtained by means of modifying a homopolymer comprising a monomer containing two or more ethylenic linkages, using a functional group-containing monomer (M1); and an aromatic ring-containing polymer (D1), as described in Preferred Example 13. Concretely, this example comprises a combination of samples (A1), (E2-1), and (D1-1).

The measured results of the electrical insulating properties are shown in Table 14. These examples exhibited a high volume resistivity, even after cross-linking, and also displayed improved electrical breakdown field, space charge characteristics and water-treeing properties.

<14> Example 66 represents a composition comprising a graft copolymer (C11) obtained by means of modifying the ethylene copolymer (A) using a functional group-containing monomer (M1); and an aromatic ring-containing polymer (D1), as described in Preferred Example 14. Concretely, this example comprises a combination of samples (C1-1) and (D1-1). The measured results of the electrical insulating properties are shown in Table 14.

<14>' In addition, Example 67 represents a composition comprising a graft copolymer (C11) obtained by means of modifying the ethylene copolymer (A) using a functional group-containing monomer (M1); and a graft copolymer (D5) obtained by means of modifying the ethylene copolymer (A) using an aromatic ring-containing monomer (M5). Concretely, this example comprises a combination of samples (C1-1) and (D5-1).

The measured results of the electrical insulating properties are shown in Table 14. The examples exhibited an improved volume resistivity, electrical breakdown field, space charge characteristics and water-treeing properties.

<15> Example 68 represents a composition comprising the ethylene copolymer (A); an aromatic ring-containing polymer (D1); and a graft copolymer (D31) obtained by means of modifying an olefin polymer containing an aromatic ring, using a functional group-containing monomer (M1), as described in Preferred Example 15. Concretely, this example comprises a combination of samples (A1), (D1-1) and (D3-1).

The measured results of the electrical insulating properties are shown in Table 15. The examples exhibited an improved volume resistivity, electrical breakdown field, space charge characteristics and water-treeing properties.

<15>' Examples 69 to 73 represent compositions comprising the ethylene copolymer (A); and at least one component selected from among a random copolymer (D2) of an olefin, at least one monomer selected from (M1) to (M4), and an aromatic ring-containing monomer (M5); a graft copolymer (D3) obtained by means of modifying an olefin polymer containing an aromatic ring, using at least one monomer selected from (M1) to (M4); a graft copolymer (D4) obtained by means of modifying a random copolymer of an olefin and at least one monomer selected from (M1) to (M4), using an aromatic ring-containing monomer (M5); a graft copolymer (D5) obtained by means of modifying the ethylene copolymer (A) using an aromatic ring-containing monomer (M5); and a graft copolymer (D6) obtained by means of the ethylene copolymer (A) using at least one monomer selected from (M1) to (M4) and an aromatic ring-containing monomer (M5). Concretely, these examples comprise compositions obtained by means of combining a sample (A1) and at least one component selected from among samples (D2-1) to (D6-1).

The measured results of the electrical insulating properties are shown in Table 15. The examples exhibited an improved volume resistivity, electrical breakdown field, space charge characteristics and water-treeing properties.

<16> Examples 74 and 75 comprise a graft copolymer (D5) obtained by means of modifying the ethylene copolymer (A) using an aromatic ring-containing monomer (M5); or a graft copolymer (D6) obtained by means of the ethylene copolymer (A) using at least one monomer selected from (M1) to (M4) and an aromatic ring-containing monomer (M5). Concretely, these examples comprise compositions a sample (D5-1) or (D6-1).

The measured results of the electrical insulating properties of these examples are shown in Table 15. These examples exhibited an improved volume resistivity, electrical breakdown field, space charge characteristics and water-treeing properties.

<17> Examples 76 and 77 represent compositions comprising a graft copolymer (D5) obtained by means of modifying the ethylene copolymer (A) using an aromatic ring-containing monomer (M5); or a graft copolymer (D6) obtained by means of the ethylene copolymer (A) using at least one monomer selected from (M1) to (M4) and an aromatic ring-containing monomer (M5), and a homopolymer (E11) comprising a monomer containing two or more ethylenic linkages. Concretely, these examples comprise compositions obtained by means of combining samples (E1-1), and (D5-1) or (D6-1).

The measured results of the electrical insulating properties are shown in Table 15. The examples exhibited a high volume resistivity, even after cross-linking, and improved electrical breakdown field, space charge characteristics and water-treeing properties.

<18> Examples 78 and 79 represent a composition comprising the ethylene copolymer (A), and a homopolymer (E11) comprising a monomer containing two or more ethylenic linkages, or alternatively, a composition comprising the ethylene copolymer (A), a homopolymer (E11) comprising a monomer containing two or more ethylenic linkages, and an aromatic ring-containing polymer (D1). Concretely, these examples comprise compositions obtained by means of combining samples (A1) and (E1-1), or samples (A1), (E1-1), and (D1-1).

The measured results of the electrical insulating properties are shown in Table 15. The examples exhibited a high volume resistivity, even after cross-linking, and improved space charge characteristics and water-treeing properties. By means of adding (D1-1), the electrical breakdown field were also improved.

TABLE 9

Electrical insulating property

| Example | Volume resistivity Room temperature ($\Omega$cm) | Volume resistivity 90° C. ($\Omega$cm) | Electrical breakdown field (MV/cm) | Space charge characteristics | Water-treeing resistance |
|---|---|---|---|---|---|
| 1 | $2.5 \times 10^{19}$ | $1.0 \times 10^{18}$ | 4.2 | ○ | ○ |
| 2 | $1.9 \times 10^{19}$ | $9.0 \times 10^{17}$ | 4.4 | ○ | ○ |
| 3 | $1.0 \times 10^{19}$ | $9.0 \times 10^{17}$ | 4.3 | ○ | ○ |
| 4 | $3.0 \times 10^{19}$ | $2.0 \times 10^{18}$ | 4.2 | ○ | ○ |
| 5 | $3.5 \times 10^{19}$ | $2.6 \times 10^{18}$ | 4.2 | ○ | ○ |
| 6 | $4.0 \times 10^{19}$ | $2.1 \times 10^{18}$ | 4.2 | ○ | ○ |
| 7 | $3.4 \times 10^{19}$ | $3.0 \times 10^{18}$ | 4.4 | ○ | ○ |
| 8 | $2.1 \times 10^{19}$ | $1.0 \times 10^{18}$ | 4.1 | ○ | ○ |
| 9 | $1.3 \times 10^{19}$ | $2.5 \times 10^{18}$ | 4.3 | ○ | ○ |
| 10 | $1.2 \times 10^{19}$ | $8.0 \times 10^{17}$ | 4.1 | ○ | ○ |
| 11 | $2.4 \times 10^{19}$ | $2.0 \times 10^{18}$ | 4.1 | ○ | ○ |
| 12 | $2.7 \times 10^{19}$ | $1.1 \times 10^{18}$ | 4.0 | ○ | ○ |

TABLE 10

Electrical insulating property

| Example | Volume resistivity Room temperature ($\Omega$cm) | Volume resistivity 90° C. ($\Omega$cm) | Electrical breakdown field (MV/cm) | Space charge characteristics | Water-treeing resistance |
|---|---|---|---|---|---|
| 13 | $1.9 \times 10^{19}$ | $2.0 \times 10^{18}$ | 4.3 | ○ | ○ |
| 14 | $1.0 \times 10^{19}$ | $5.0 \times 10^{17}$ | 3.9 | ○ | ○ |
| 15 | $2.1 \times 10^{19}$ | $1.1 \times 10^{18}$ | 4.2 | ○ | ○ |
| 16 | $2.0 \times 10^{19}$ | $1.0 \times 10^{18}$ | 4.0 | ○ | ○ |
| 17 | $9.9 \times 10^{18}$ | $7.9 \times 10^{17}$ | 4.0 | ○ | ○ |
| 18 | $2.4 \times 10^{19}$ | $1.0 \times 10^{18}$ | 4.5 | ○ | ○ |
| 19 | $1.6 \times 10^{19}$ | $1.8 \times 10^{18}$ | 4.4 | ○ | ○ |
| 20 | $2.6 \times 10^{19}$ | $2.1 \times 10^{18}$ | 4.3 | ○ | ○ |
| 21 | $1.2 \times 10^{19}$ | $3.5 \times 10^{17}$ | 3.9 | ○ | ○ |
| 22 | $5.0 \times 10^{18}$ | $7.0 \times 10^{17}$ | 3.9 | ○ | ○ |
| 23 | $2.4 \times 10^{19}$ | $4.0 \times 10^{17}$ | 4.0 | ○ | ○ |

TABLE 11

Electrical insulating property

| Example | Volume resistivity Room temperature ($\Omega$cm) | Volume resistivity 90° C. ($\Omega$cm) | Electrical breakdown field (MV/cm) | Space charge characteristics | Water-treeing resistance |
|---|---|---|---|---|---|
| 24 | $2.7 \times 10^{19}$ | $7.0 \times 10^{17}$ | 4.1 | ○ | ○ |
| 25 | $3.9 \times 10^{19}$ | $2.6 \times 10^{18}$ | 4.4 | ○ | ○ |
| 26 | $4.0 \times 10^{19}$ | $3.0 \times 10^{18}$ | 4.5 | ○ | ○ |
| 27 | $2.4 \times 10^{19}$ | $3.5 \times 10^{17}$ | 3.9 | ○ | ○ |
| 28 | $1.4 \times 10^{19}$ | $3.9 \times 10^{17}$ | 4.0 | ○ | ○ |
| 29 | $6.1 \times 10^{18}$ | $1.9 \times 10^{17}$ | 3.9 | ○ | ○ |
| 30 | $9.5 \times 10^{18}$ | $2.5 \times 10^{17}$ | 4.0 | ○ | ○ |
| 31 | $8.0 \times 10^{18}$ | $2.0 \times 10^{17}$ | 4.0 | ○ | ○ |
| 32 | $1.6 \times 10^{19}$ | $8.5 \times 10^{17}$ | 4.4 | ○ | ○ |
| 33 | $2.1 \times 10^{19}$ | $1.0 \times 10^{18}$ | 4.3 | ○ | ○ |

TABLE 12

| | Electrical insulating property | | | | |
|---|---|---|---|---|---|
| | Volume resistivity | | Electrical | Space | |
| Example | Room temperature ($\Omega$cm) | 90° C. ($\Omega$cm) | breakdown field (MV/cm) | charge characteristics | Water-treeing resistance |
| 34 | $2.5 \times 10^{18}$ | $1.0 \times 10^{17}$ | 4.1 | ○ | ○ |
| 35 | $6.0 \times 10^{18}$ | $4.0 \times 10^{17}$ | 4.1 | ○ | ○ |
| 36 | $1.2 \times 10^{18}$ | $5.8 \times 10^{16}$ | 4.2 | ○ | ○ |
| 37 | $1.4 \times 10^{18}$ | $8.5 \times 10^{16}$ | 4.0 | ○ | ○ |
| 38 | $2.3 \times 10^{18}$ | $8.8 \times 10^{16}$ | 4.1 | ○ | ○ |
| 39 | $1.8 \times 10^{18}$ | $1.0 \times 10^{17}$ | 4.0 | ○ | ○ |
| 40 | $4.6 \times 10^{18}$ | $1.5 \times 10^{17}$ | 3.9 | ○ | ○ |
| 41 | $1.0 \times 10^{18}$ | $4.9 \times 10^{16}$ | 3.9 | ○ | ○ |
| 42 | $2.1 \times 10^{18}$ | $2.0 \times 10^{17}$ | 4.1 | ○ | ○ |
| 43 | $1.9 \times 10^{18}$ | $1.3 \times 10^{17}$ | 4.0 | ○ | ○ |
| 44 | $1.6 \times 10^{18}$ | $1.4 \times 10^{17}$ | 4.0 | ○ | ○ |
| 45 | $1.1 \times 10^{18}$ | $5.1 \times 10^{16}$ | 3.8 | ○ | ○ |

TABLE 13

| | Electrical insulating property | | | | |
|---|---|---|---|---|---|
| | Volume resistivity | | Electrical | Space | |
| Example | Room temperature ($\Omega$cm) | 90° C. ($\Omega$cm) | breakdown field (MV/cm) | charge characteristics | Water-treeing resistance |
| 46 | $2.0 \times 10^{18}$ | $8.6 \times 10^{16}$ | 4.1 | ○ | ○ |
| 47 | $9.8 \times 10^{17}$ | $8.9 \times 10^{16}$ | 4.1 | ○ | ○ |
| 48 | $2.5 \times 10^{18}$ | $1.2 \times 10^{17}$ | 4.1 | ○ | ○ |
| 49 | $2.2 \times 10^{18}$ | $1.5 \times 10^{17}$ | 4.1 | ○ | ○ |
| 50 | $1.2 \times 10^{18}$ | $7.2 \times 10^{16}$ | 4.1 | ○ | ○ |
| 51 | $6.5 \times 10^{18}$ | $3.5 \times 10^{17}$ | 4.3 | ○ | ○ |
| 52 | $6.4 \times 10^{18}$ | $3.4 \times 10^{17}$ | 4.3 | ○ | ○ |
| 53 | $5.0 \times 10^{18}$ | $3.9 \times 10^{17}$ | 4.0 | ○ | ○ |
| 54 | $5.2 \times 10^{18}$ | $3.0 \times 10^{17}$ | 4.0 | ○ | ○ |
| 55 | $2.0 \times 10^{18}$ | $1.1 \times 10^{17}$ | 3.9 | ○ | ○ |
| 56 | $2.0 \times 10^{18}$ | $1.3 \times 10^{17}$ | 4.0 | ○ | ○ |

TABLE 14

| | Electrical insulating property | | | | |
|---|---|---|---|---|---|
| | Volume resistivity | | Electrical | Space | |
| Example | Room temperature ($\Omega$cm) | 90° C. ($\Omega$cm) | breakdown field (MV/cm) | charge characteristics | Water-treeing resistance |
| 57 | $2.2 \times 10^{18}$ | $1.3 \times 10^{17}$ | 4.0 | ○ | ○ |
| 58 | $9.9 \times 10^{17}$ | $6.3 \times 10^{16}$ | 3.8 | ○ | ○ |
| 59 | $5.0 \times 10^{18}$ | $8.5 \times 10^{17}$ | 4.8 | ○ | ○ |
| 60 | $4.0 \times 10^{18}$ | $7.0 \times 10^{17}$ | 4.7 | ○ | ○ |
| 61 | $2.0 \times 10^{18}$ | $2.0 \times 10^{17}$ | 4.5 | ○ | ○ |
| 62 | $5.3 \times 10^{18}$ | $8.5 \times 10^{17}$ | 5.0 | ○ | ○ |
| 63 | $5.5 \times 10^{18}$ | $9.6 \times 10^{17}$ | 5.0 | ○ | ○ |
| 64 | $9.6 \times 10^{18}$ | $9.9 \times 10^{17}$ | 5.0 | ○ | ○ |
| 65 | $3.2 \times 10^{18}$ | $1.4 \times 10^{17}$ | 4.8 | ○ | ○ |
| 66 | $2.4 \times 10^{19}$ | $3.5 \times 10^{17}$ | 4.8 | ○ | ○ |
| 67 | $3.4 \times 10^{19}$ | $3.0 \times 10^{18}$ | 5.0 | ○ | ○ |

TABLE 15

| | Electrical insulating property | | | | |
|---|---|---|---|---|---|
| | Volume resistivity | | Electrical | Space | |
| Example | Room temperature ($\Omega$cm) | 90° C. ($\Omega$cm) | breakdown field (MV/cm) | charge characteristics | Water-treeing resistance |
| 68 | $1.5 \times 10^{19}$ | $6.4 \times 10^{17}$ | 4.9 | ○ | ○ |
| 69 | $9.3 \times 10^{18}$ | $7.0 \times 10^{17}$ | 4.8 | ○ | ○ |
| 70 | $1.6 \times 10^{19}$ | $7.9 \times 10^{17}$ | 4.9 | ○ | ○ |
| 71 | $1.0 \times 10^{19}$ | $7.0 \times 10^{17}$ | 4.9 | ○ | ○ |
| 72 | $3.5 \times 10^{18}$ | $7.0 \times 10^{17}$ | 4.9 | ○ | ○ |
| 73 | $9.8 \times 10^{18}$ | $7.2 \times 10^{17}$ | 5.0 | ○ | ○ |
| 74 | $3.1 \times 10^{18}$ | $8.0 \times 10^{17}$ | 4.8 | ○ | ○ |
| 75 | $8.8 \times 10^{18}$ | $9.5 \times 10^{17}$ | 4.9 | ○ | ○ |
| 76 | $1.2 \times 10^{18}$ | $6.8 \times 10^{17}$ | 4.8 | ○ | ○ |
| 77 | $4.8 \times 10^{18}$ | $5.8 \times 10^{17}$ | 4.9 | ○ | ○ |
| 78 | $1.1 \times 10^{18}$ | $1.0 \times 10^{17}$ | 4.2 | ○ | ○ |
| 79 | $2.9 \times 10^{18}$ | $7.8 \times 10^{17}$ | 4.9 | ○ | ○ |

Comparative Example 1 to 19

The components selected from among the components (A), (C), (D) and (E) were used according to the mixing ratio shown in Tables 16 and 17, and cross-linked as necessary.

TABLE 16-1

| | Resin composition | | | | | | | |
|---|---|---|---|---|---|---|---|---|
| | Component (A) | | Component (E) | | Component (C) | | Component (D) | |
| Comparative Example | Type | Parts by weight | Type | Parts by weight | Type | Parts by weight | Type | Parts by weight |
| 1 | A'1 | 100.0 | | | | | | |
| 2 | A'1 | 100.0 | | | | | | |
| 3 | A'2 | 100.0 | | | | | | |
| 4 | A'2 | 100.0 | | | | | | |
| 5 | A'3 | 100.0 | | | | | | |
| 6 | A'4 | 100.0 | | | | | | |
| 7 | A'5 | 100.0 | | | | | | |
| 8 | A1 | 100.0 | | | | | | |
| 9 | A1 | 100.0 | | | | | | |
| 10 | A2 | 100.0 | | | | | | |

TABLE 16-2

| Comparative Example | Resin composition | | | | Measurement condition | |
|---|---|---|---|---|---|---|
| | Aromatic component (mol/g) | Functional group component Type | Functional group component (mol/g) | Number of ethylenic linkages (per 1000 C) | Cross-linking | Cross-linking agent |
| 1 | | | | | None | |
| 2 | | | | | Present | DCP |
| 3 | | | | | None | |
| 4 | | | | | Present | PH |
| 5 | | | | | None | |
| 6 | | | | | None | |
| 7 | | | | | None | |
| 8 | | | | | None | |
| 9 | | | | | Present | PH |
| 10 | | | | | None | |

TABLE 17-1

| Comparative Example | Resin composition | | | | | | | |
|---|---|---|---|---|---|---|---|---|
| | Component (A) | | Component (E) | | Component (C) | | Component (D) | |
| | Type | Parts by weight | Type | Parts by weight | Type | Parts by weight | Type | Parts by weight |
| 11 | A2 | 100.0 | | | | | | |
| 12 | A3 | 100.0 | | | | | | |
| 13 | A1 | 10.0 | | | | | | | 
| | A'1 | 90.0 | | | | | | |
| 14 | A1 | 10.0 | | | | | | |
| | A'1 | 90.0 | | | | | | |
| 15 | A2 | 10.0 | | | | | | |
| | A'1 | 90.0 | | | | | | |
| 16 | A1 | 98.5 | | | C1-1 | 1.5 | | |
| 17 | A'4 | 92.0 | | | C2-1 | 8.0 | | |
| 18 | A'5 | 92.0 | | | C2-1 | 8.0 | | |
| 19 | A1 | 99.93 | | | | | D6-1 | 0.07 |

TABLE 17-2

| Comparative Example | Resin composition | | | | Measurement condition | |
|---|---|---|---|---|---|---|
| | Aromatic component (mol/g) | Functional group component Type | Functional group component (mol/g) | Number of ethylenic linkages (per 1000 C) | Cross-linking | Cross-linking agent |
| 11 | | | | | Present | PH |
| 12 | | | | | None | |
| 13 | | | | | None | |
| 14 | | | | | Present | DCP |
| 15 | | | | | None | |
| 16 | | M1 | $3.8 \times 10^{-7}$ | | None | |
| 17 | | M1 | $2.0 \times 10^{-6}$ | | None | |
| 18 | | M1 | $2.0 \times 10^{-6}$ | | None | |
| 19 | $4.8 \times 10^{-7}$ | M2 | $1.3 \times 10^{-8}$ | | None | |

As Comparative Examples 1 to 7, the measured results of other non-cross-linked and cross-linked polyolefins (A') are shown in Table 18.

Both the volume resistivity and electrical breakdown field were low, and space charge characteristics and water-treeing properties were unfavorable.

As Comparative Examples 8 to 12, the measured results of non-cross-linked, and cross-linked ethylene copolymers (A) are shown in Table 18.

Each of the aforementioned property was better than that of the above polyolefins (A'); however, these properties were not satisfactory.

As Comparative Examples 13 to 15, the measured results of non-cross-linked, and cross-linked blended products of the ethylene copolymer (A) and the other polyolefin (A') are shown in Table 18.

As in the case of the ethylene copolymer (A) alone, each property was better than that of the other polyolefin (A'), however, these properties overall were unsatisfactory.

Comparative Examples 16 and 19 are blended products of the ethylene copolymer (A), and a graft copolymer (C11) obtained by means of modifying the ethylene copolymer (A) using a functional group-containing monomer(M1); or a graft copolymer (D6) obtained by means of modifying the ethylene copolymer (A) using at least one monomer selected from (M1) to (M4) and an aromatic ring-containing monomer (M5). These examples comprise compositions obtained by means of blending samples (A-1), and (C1-1) or (D6-1).

The measured results of the electrical insulating properties are shown in Table 18. Since the content of the monomer unit was $5 \times 10^{-7}$ mol less per one gram of the resin components, there were no improvements seen in the volume resistivity, electrical breakdown field, or space charge characteristics.

Comparative Examples 17 and 18 represent compositions comprising another polyolefin (A'), such as linear low density polyethylene obtained by means of using a single site-type catalyst or metallocene catalyst, and a graft copolymer (C21) obtained by means of modifying the other polyolefin (A') using a functional group-containing monomer (M1).

The measured results of the electrical insulating properties are shown in Table 18. Since these examples did not contain the ethylene copolymer (A), none of electrical insulating properties, i.e., the volume resistivity, electrical breakdown field, or space charge characteristics, were satisfactory.

TABLE 18

| Comparative Example | Electrical insulating property | | | | |
|---|---|---|---|---|---|
| | Volume resistivity | | Electrical breakdown field (MV/cm) | Space charge characteristics | Water-treeing resistance |
| | Room temperature ($\Omega$cm) | 90° C. ($\Omega$cm) | | | |
| 1 | $2.0 \times 10^{17}$ | $2.0 \times 10^{15}$ | 3.3 | Large like-polarity | X |
| 2 | $6.0 \times 10^{16}$ | $6.1 \times 10^{14}$ | 3.1 | Large reverse polarity | X |
| 3 | $1.6 \times 10^{18}$ | $9.2 \times 10^{15}$ | 3.4 | Large reverse polarity | X |
| 4 | $1.1 \times 10^{17}$ | $8.1 \times 10^{14}$ | 3.2 | Large reverse polarity | X |
| 5 | $9.0 \times 10^{18}$ | $1.0 \times 10^{18}$ | 4.5 | Large reverse polarity | Δ |
| 6 | $1.0 \times 10^{18}$ | $1.0 \times 10^{17}$ | 3.7 | Small like-polarity | Δ |
| 7 | $1.0 \times 10^{18}$ | $1.0 \times 10^{17}$ | 3.7 | Small like-polarity | Δ |
| 8 | $3.5 \times 10^{18}$ | $5.6 \times 10^{17}$ | 3.9 | Large like-polarity | ○ |
| 9 | $5.0 \times 10^{17}$ | $5.0 \times 10^{16}$ | 3.8 | Large like-polarity | ○ |
| 10 | $2.6 \times 10^{18}$ | $4.1 \times 10^{17}$ | 4.2 | Large like-polarity | ○ |
| 11 | $3.5 \times 10^{17}$ | $4.8 \times 10^{16}$ | 4.1 | Large like-polarity | ○ |
| 12 | $4.0 \times 10^{18}$ | $6.0 \times 10^{17}$ | 4.0 | Large like-polarity | ○ |
| 13 | $2.3 \times 10^{18}$ | $8.0 \times 10^{16}$ | 3.7 | Large like-polarity | Δ |
| 14 | $4.0 \times 10^{17}$ | $2.5 \times 10^{15}$ | 3.6 | Large reverse polarity | Δ |
| 15 | $1.9 \times 10^{18}$ | $7.0 \times 10^{16}$ | 4.0 | Large like-polarity | Δ |
| 16 | $4.0 \times 10^{18}$ | $6.0 \times 10^{17}$ | 3.8 | Small like-polarity | Δ |
| 17 | $5.1 \times 10^{18}$ | $2.3 \times 10^{17}$ | 3.7 | Small like-polarity | Δ |
| 18 | $4.5 \times 10^{18}$ | $1.7 \times 10^{15}$ | 3.9 | Small reverse polarity | Δ |
| 19 | $2.9 \times 10^{18}$ | $6.2 \times 10^{17}$ | 3.8 | Large reverse polarity | Δ |

(Electric Wire Covering Properties)

Copper wires were respectively covered by the compositions of Examples 4, 10, 34, 51, and 62, and their processabilities were evaluated. The covering conditions were as follows: core wire of 0.9 mm; dice diameter of 2.5 mm; nipple diameter of 0.95 mm; dice nipple clearance of 5.3 mm; finished outer diameter of 2.45 mm; and winding speed of 100 m/minute. After covering, upon visual examination, the surface roughness of the examples was small, such that the example were deemed appropriate for practical use.

(Manufacturing of Cables)

Figure 5:
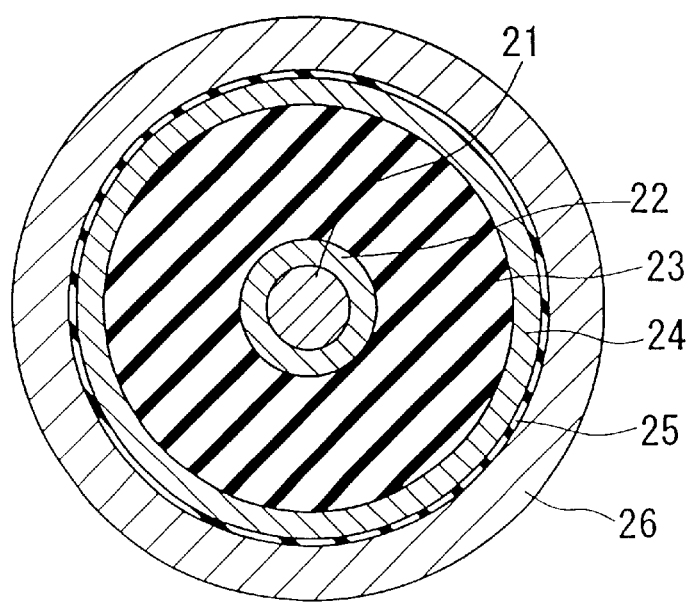
FIG. 5 is a cross-sectional view showing an example of an electric power cable of the present invention.

Using the compositions of Examples 4, 10, 34, 51, and 62, the cables shown in FIG. 5 were manufactured. Both the manufacturability and properties of the cable were favorable.

The electric cable shown in FIG. 5 formed a concentric circle comprising, from the innermost to outermost material, a conductor material 21 comprising aggregated wires of conductive metal; inner semiconductor layer 22; insulating layer 23 comprising the ethylene copolymer; outer semiconductor layer 24; aluminum foil 25; and protective material 26 (inorganic flame retardant-containing polyolefin).

Industrial Applicability

The resin material for an electrical insulating material according to the present invention contains ethylenic linkages and/or a specific monomer unit in the resin component therein, which contains an ethylene α-olefin copolymer (A) which satisfies the aforementioned specific conditions. Accordingly, the resin material for an electrical insulating material according to the present invention exhibits a superior processability and thermal resistance, in addition to superior electrical insulating properties, such as superior volume resistivity, space charge characteristics, dielectric breakdown strength, water-treeing resistance, and the like, in which a reduction in the mechanical strength does not occur. In addition, the resin material for an electrical insulating materials according to the present invention is rich in cross-linkability, and even after cross-linking, exhibits superior volume resistivity, space charge characteristics, dielectric breakdown strength, water-treeing resistance, and the like.

Furthermore, when the halogen concentration in the aforementioned copolymer of ethylene and $C_{4-12}$ α-olefin is 10 ppm or less, it becomes unnecessary to supply additives such as a halogen acceptor, and the like, which in turn leads to superior electrical insulating properties.

In addition, when the aforementioned copolymer of ethylene and $C_{4-12}$ α-olefin is obtained by means of copolymerizing ethylene and $C_{4-12}$ α-olefin in the presence of a catalyst comprising an cyclic organic compound containing at least a conjugated double bond, and a compound containing transition metal from group IV of the Periodic Table, its processability, thermal resistance, mechanical strength, and electrical insulating performance are further improved.

In addition, the electrical insulating material according to the present invention employs one of the aforementioned resin materials for an electrical insulating material, and thus exhibits a superior processability, thermal resistance, mechanical strength, and electrical insulating properties.

Furthermore, when one of the aforementioned resin materials for an electrical insulating material is first cross-linked and then used, the mechanical strength is further improved.

The resin material for an electrical insulating material and electrical insulating material formed in this manner may be used as a electric wire and cable, insulating material for a condenser, and as an insulating material and distributing cord for high electrical voltage parts such as an X-ray generator, or the like.

In addition, the electric wire and cable according to the present invention employs the aforementioned non-cross-linked or cross-linked electrical insulating material, and thus exhibits a superior mechanical strength and electrical insulating properties.

What is claimed is:

1. An electrical insulating material comprising a resin material for an electrical insulating material comprising a resin component which comprises an ethylene α-olefin copolymer (A), obtained by means of copolymerizing ethylene and $C_{4-12}$ α-olefin, said ethylene α-olefin copolymer (A) satisfying specific conditions (i) to (v):

(i) a density d of 0.92 to 0.96 g/cm$^3$, (ii) a melt flow rate (MFR) of 0.01 to 200 g/10 minutes, (iii) a molecular weight distribution (Mw/Mn) of 1.5 to 5.0, (iv) possessing only one peak in terms of the number of peaks observed in an elution temperature-eluted amount curve as measured by the continuous temperature raising elution fractionation (TREF) method, and from the integrated elution curve obtained by said elution temperature-eluted amount curve, the difference $T_{75}-T_{25}$ in the temperature and said density d respectively follow the relationships shown by formula a and formula b, wherein $T_{25}$ is the temperature where 25% of the total elution is obtained, and $T_{75}$ is the temperature where 75% of the total elution is obtained; and (v) possessing one or two melting point peaks, and among these the highest melting point $T_m$ and said density d follow the relationship described by formula c;

wherein said resin component contains a unit (B) derived from at least one type of monomer selected from the group consisting of a carbonyl or carbonyl derivative group-containing monomer (M1), a hydroxyl group-containing monomer (M2), a nitro group-containing monomer (M3), a nitrile group-containing monomer (M4), an aromatic ring-containing monomer (M5) and a compound or monomer containing two or more ethylenic linkages (M6); and when said unit (B) is derived from at least one type of monomer selected from M1 to M5, the concentration of said unit (B) ranges from $5 \times 10^{-7}$ to $5 \times 10^{-3}$ mol per one gram of said resin component, and when said unit (B) is derived from M6, the number of ethylenic linkages per 1000 carbon atoms of said resin component is at least 0.8, if $d<0.950$ g/cm$^3$, then (Formula a)

$T_{75}-T_{25} \geq -300 \times d+285$ if $d \geq 0.950$ g/cm$^3$, then $T_{75}-T_{25} \geq 0$ $T_{75}-T_{25} \leq -670 \times d+644$ (Formula b)

$T_{m1} \geq 150 \times d-17$ (Formula c)

2. An electrical insulating material according to claim 1, comprising a maleic anhydride-modified ethylene α-olefin copolymer (A).

3. An electrical insulating material according to claim 1, comprising a maleic anhydride-modified ethylene α-olefin copolymer (A) and an ethylene-styrene random copolymer.

4. An electrical insulating material comprising a cross-linked resin material obtained by cross-linking of a resin material for an electrical insulating material according to claim 1.

5. An electrical insulating material according to claim 4, wherein a resin material for an electrical insulating material comprising a maleic anhydride-modified liquid polybutadiene, and a maleic anhydride-modified ethylene α-olefin copolymer (A) is cross-linked.

6. An electrical insulating material according to claim 4, wherein a resin material for an electrical insulating material comprising a maleic anhydride-modified liquid polybutadiene, and an ethylene-styrene random copolymer is cross-linked.

7. An electrical insulating material according to claim 4, wherein a resin material for an electrical insulating material comprising a maleic anhydride-modified liquid polybutadiene, maleic anhydride-modified ethylene α-olefin copolymer (A) and an ethylene-styrene random copolymer is cross-linked.

8. An electrical insulating material according to claim 1, wherein said ethylene α-olefin copolymer (A) satisfies specific conditions (i) to (vii):

(i) a density d of 0.92 to 0.96 g/cm$^3$, (ii) a melt flow rate (MFR) of 0.01 to 200 g/10 minutes, (iii) a molecular weight distribution (Mw/Mn) of 1.5 to 3.5, (iv) possessing only one peak in terms of the number of peaks observed in an elution temperature-eluted amount curve as measured by the continuous temperature raising elution fractionation (TREF) method, and from the integrated elution curve obtained by said elution temperature-eluted amount curve, the difference $T_{75}-T_{25}$ in the temperature and said density d respectively follow the relationships shown by formula a and formula b, wherein $T_{25}$ is the temperature where 25% of the total elution is obtained, and $T_{75}$ is the temperature where 75% of the total elution is obtained;

(v) possessing one or two melting point peaks, and among these the highest melting,point $T_{m1}$ and said density d follow the relationship described by formula c;

(vi) an electrical activation energy of no greater than 0.4 eV; and (vii) the melt tension (MT) and melt flow rate (MFR) follow the relationship shown by formula d;

if $d<0.950$ g/cm$^3$, then (Formula a)

$T_{75}-T_{25} \geq -300 \times d+285$ if $d \geq 0.950$ g/cm$^3$, then $T_{75}-T_{25} \geq 0$ $T_{75}-T_{25} \leq -670 \times d+644$ (Formula b)

$T_{m1} \geq 150 \times d-17$ (Formula c)

$\log MT \leq -0.572 \times \log MFR+0.3.$ (Formula d)

9. An electrical insulating material according to claim 1, wherein said ethylene α-olefin copolymer (A) is obtained by means of copolymerizing ethylene and a $C_{4-12}$ α-olefin under the presence of a catalyst comprising a cyclic organic compound containing at least a conjugated double bond, and a compound containing transition metal from group IV of the Periodic Table.

10. An electrical insulating material according to claim 1, wherein the halogen concentration within said ethylene α-olefin copolymer (A) is no greater than 10 ppm.

11. An electrical insulating material according to claim 1, wherein said resin component comprises said ethylene α-olefin copolymer (A), and another polyolefin (A').

12. An electrical insulating material according to claim 11, wherein said other polyolefin (A') is at least one compound selected from the group consisting of a polyethylene obtained by means of a high pressure radical polymerization, a high density polyethylene, a medium density polyethylene, and a linear low density polyethylene.

13. An electrical insulating material according to claim 1, wherein said carbonyl or carbonyl derivative group-containing monomer (M1) to be introduced into said resin component is at least one compound selected from the group consisting of maleic anhydride and (meth)acrylic acid.

14. An electrical insulating material according to claim 13, wherein a maleic anhydride-modified ethylene α-olefin copolymer (A) is used at the time said carbonyl or carbonyl derivative group-containing monomer (M1) is introduced into said resin component.

15. An electrical insulating material according to claim 1, wherein a polystyrene, ethylene-styrene random copolymer, or an ethylene copolymer (A), which has been modified by means of grafting an aromatic ring-containing monomer, is used at the time said aromatic ring-containing monomer (M5) is introduced into said resin component.

16. An electrical insulating material according to claim 1, wherein at least one compound selected from the group consisting of a liquid polybutadiene, a maleic anhydride-modified liquid polybutadiene, an ethylene-aryl(meth)acrylate copolymer, and an ethylene-vinyl(meth)acrylate copolymer is used at the time said compound or monomer containing two or more ethylenic linkages (M6) is introduced into said resin component.

17. An electrical insulating material according to claim 1, wherein said resin component contains said compound or monomer containing two or more ethylenic linkages (M6) and said carbonyl or carbonyl derivative group-containing monomer (M1).

18. An electrical insulating material according to claim 1, wherein a maleic anhydride-modified liquid polybutadiene and a maleic anhydride-modified ethylene α-olefin copolymer (A) are used at the time said carbonyl or carbonyl derivative group-containing monomer (M1) and said compound or monomer containing two or more ethylenic linkages (M6) are introduced into said resin component.

19. An electrical insulating material according to claim 1, wherein said resin component contains said compound or monomer containing two or more ethylenic linkages (M6) and said aromatic ring-containing monomer (M5).

20. An electrical insulating material according to claim 19, wherein a maleic anhydride-modified liquid polybutadiene and an ethylene-styrene random copolymer are used at the time said compound or monomer containing two or more ethylenic linkages (M6) and said aromatic ring-containing monomer (M5) are introduced into said resin component.

21. An electrical insulating material according to claim 1, wherein said resin component contains said carbonyl or carbonyl derivative group-containing monomer (M1) and said aromatic ring-containing monomer (M5).

22. An electrical insulating material according to claim 21, wherein a maleic anhydride-modified ethylene α-olefin copolymer (A) and an ethylene-styrene random copolymer are used at the time said carbonyl or carbonyl derivative group-containing monomer (M1) and said aromatic ring-containing monomer (M5) are introduced into said resin component.

23. An electrical insulating material according to claim 1, wherein said resin component contains said carbonyl or carbonyl derivative group-containing monomer (M1), said compound or monomer containing two or more ethylenic linkages (M6), and said aromatic ring-containing monomer (M5).

24. An electrical insulating material according to claim 23, wherein a maleic anhydride-modified liquid polybutadiene, a maleic anhydride-modified ethylene α-olefin copolymer (A) and a ethylene-styrene random copolymer are used at the time said carbonyl or carbonyl derivative group-containing monomer (M1), said compound or monomer containing two or more ethylenic linkages (M6), and said aromatic ring-containing monomer M5 are introduced into said resin component.

* * * * *